United States Patent
Li et al.

(10) Patent No.: US 11,399,195 B2
(45) Date of Patent: Jul. 26, 2022

(54) RANGE OF MINIMUM CODING BLOCK SIZE IN VIDEO CODING

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/078,302

(22) Filed: Oct. 23, 2020

(65) Prior Publication Data

US 2021/0136399 A1    May 6, 2021

Related U.S. Application Data

(60) Provisional application No. 62/928,150, filed on Oct. 30, 2019.

(51) Int. Cl.
| | |
|---|---|
| *H04N 19/51* | (2014.01) |
| *H04N 19/70* | (2014.01) |
| *H04N 19/184* | (2014.01) |
| *H04N 19/176* | (2014.01) |
| *H04N 19/44* | (2014.01) |

(Continued)

(52) U.S. Cl.
CPC ........... *H04N 19/51* (2014.11); *H04N 19/176* (2014.11); *H04N 19/184* (2014.11); *H04N 19/186* (2014.11); *H04N 19/44* (2014.11); *H04N 19/70* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 10,666,943 B2 * | 5/2020 | Fu ......................... | H04N 19/176 |
| 2017/0026655 A1 * | 1/2017 | Deshpande ............ | H04N 19/58 |
| 2018/0199072 A1 * | 7/2018 | Li ......................... | H04N 19/186 |

(Continued)

OTHER PUBLICATIONS

Chen et al., "Algorithm description for Versatile Video Coding and Test Model 6 (VTM 6)," Joint Video Expert Team (JVET) of ITU-T SG 16 WP 3 and ISO/IEC JTC 1/SC 29/WG 11, 15th Meeting: Gothenbutg, Sweden, Jul. 3-12, 2019, Document: JVET-O2002-v2 (Year: 2019).*

(Continued)

*Primary Examiner* — Reza Aghevli
(74) *Attorney, Agent, or Firm* — ArentFox Schiff LLP

(57) ABSTRACT

An apparatus for video decoding includes circuitry configured to receive a syntax element from a bitstream of a coded video being included in a parameter set or a picture header and specifying a minimum luma coding block size, verify whether the minimum luma coding block size is within a range of allowable minimum luma coding block sizes having an upper limit smaller than a maximum allowable coding tree unit (CTU) size, and decode a coded picture referring the parameter set or including the picture header in the coded video based on the minimum luma coding block size. The upper limit of the range of allowable minimum luma coding block sizes can be a predefined maximum allowable minimum luma coding block size.

5 Claims, 22 Drawing Sheets

(51) Int. Cl.
*H04N 19/186* (2014.01)
*H04N 19/96* (2014.01)

(56) References Cited

U.S. PATENT DOCUMENTS

| | | | | |
|---|---|---|---|---|
| 2018/0324420 A1* | 11/2018 | Wang | | H04N 19/174 |
| 2019/0098305 A1* | 3/2019 | Fu | | H04N 19/119 |
| 2019/0149823 A1* | 5/2019 | Lim | | H04N 19/70 |
| | | | | 375/240.03 |
| 2019/0166375 A1* | 5/2019 | Jun | | H04N 19/13 |
| 2019/0174136 A1* | 6/2019 | Jun | | H04N 19/593 |
| 2019/0191155 A1* | 6/2019 | Ko | | H04N 19/184 |
| 2019/0200040 A1* | 6/2019 | Lim | | H04N 19/105 |
| 2019/0208199 A1* | 7/2019 | Cho | | H04N 19/105 |
| 2019/0215512 A1* | 7/2019 | Lee | | H04N 19/176 |
| 2019/0215516 A1* | 7/2019 | Lim | | H04N 19/103 |
| 2019/0222837 A1* | 7/2019 | Lee | | H04N 19/44 |
| 2019/0222865 A1* | 7/2019 | Zhang | | H04N 19/433 |
| 2019/0238841 A1* | 8/2019 | Lee | | H04N 19/80 |
| 2019/0246102 A1* | 8/2019 | Cho | | H04N 19/109 |
| 2019/0246103 A1* | 8/2019 | Jun | | H04N 19/182 |
| 2019/0268594 A1* | 8/2019 | Lim | | H04N 19/122 |
| 2019/0297325 A1* | 9/2019 | Lim | | H04N 19/119 |
| 2019/0306506 A1* | 10/2019 | Chen | | H04N 19/119 |
| 2019/0306526 A1* | 10/2019 | Cho | | G06N 20/00 |
| 2020/0092578 A1* | 3/2020 | Huang | | G06T 3/0075 |
| 2020/0204799 A1* | 6/2020 | Lee | | H04N 19/593 |
| 2020/0244956 A1* | 7/2020 | Lee | | H04N 19/176 |
| 2020/0322602 A1* | 10/2020 | Huang | | H04N 19/70 |
| 2021/0258618 A1* | 8/2021 | Gao | | H04N 19/119 |
| 2021/0266552 A1* | 8/2021 | Kotra | | H04N 19/124 |

OTHER PUBLICATIONS

Jianle Chen, et al, Algorithm description for Versatile Video Coding and Test Model 6 (VTM 6), Joint Video Experts Team (JVET), of ITU-T SG 16 WP 3 and ISO/IEC JTC 1/SC 29/WG 11, 15th Meeting: Gothenburg, SE, Jul. 3-12, 2019, Document: JVET-O2002-v2, 89 pgs.

Benjamin Bross, et al, Versatile Video Coding (Draft 7), Joint Video Experts Team (JVET), of ITU-T SG 16 WP 3 and ISO/IEC JTC 1/SC 29/WG 11, 16th Meeting: Geneva, CH, Oct. 1-11, 2019, 495 pgs.

Series H: Audiovisual and Multimedia Systems, Infrastructure of audiovisual services—Coding of moving video, High efficiency video coding, ITU-T, H.265 (Dec. 2016), 664 pgs.

International Search Report and Written Opinion dated Jan. 26, 2021 in International PCT No. PCT/US 20/57482, 9 pgs.

* cited by examiner

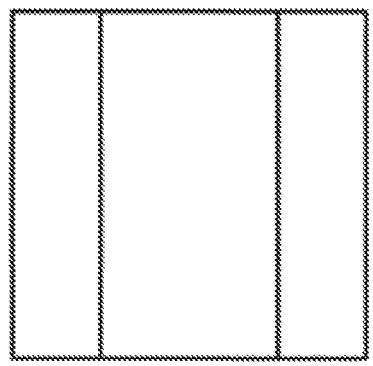
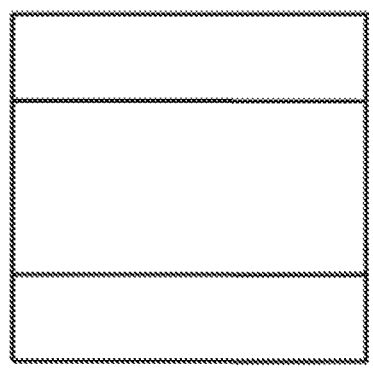
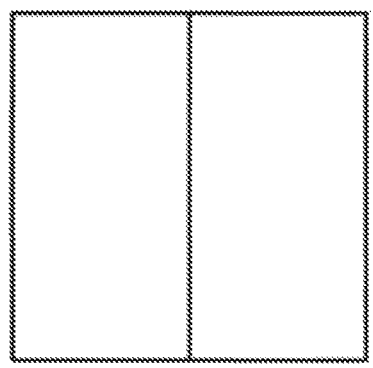
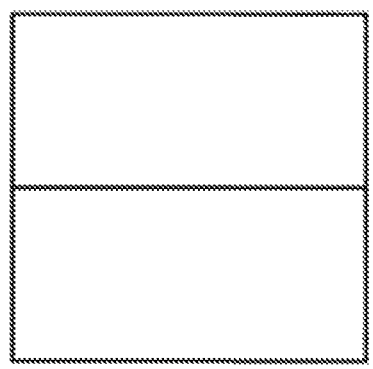
FIG. 15

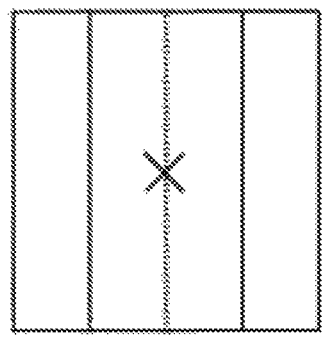
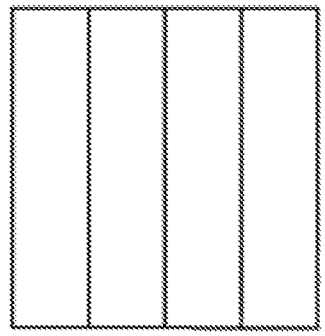
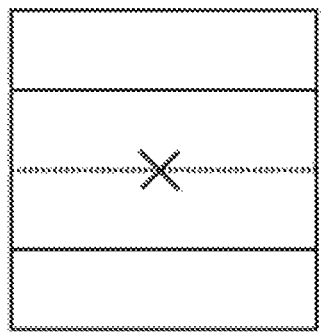
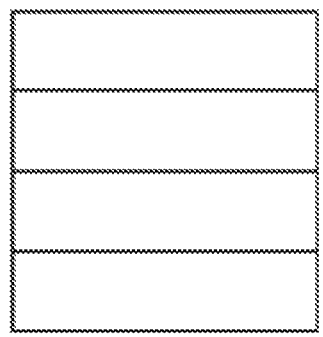
FIG. 19

RANGE OF MINIMUM CODING BLOCK SIZE IN VIDEO CODING

INCORPORATION BY REFERENCE

This present disclosure claims the benefit of priority to U.S. Provisional Application No. 62/928,150, "METHODS ON RANGE OF MINIMUM CODING BLOCK SIZE" filed on Oct. 30, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refer to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes circuitry. The circuitry is configured to receive a first syntax element from a bitstream of a coded video. The first syntax element is included in a parameter set or a picture header and specifies a minimum luma coding block size in an example. The circuitry is further configured to verify whether the minimum luma coding block size is within a range of allowable minimum luma coding block sizes having an upper limit smaller than a maximum allowable coding tree unit (CTU) size, and decode a coded picture in the coded video based on the minimum luma coding block size. The coded picture refers the parameter set or includes the picture header in an example. In an embodiment, the upper limit of the range of allowable minimum luma coding block sizes can be a predefined maximum allowable minimum luma coding block size.

In an embodiment, the circuitry is further configured to receive a second syntax element from the bitstream of the coded video. The second syntax element can specify a CTU size and be included in the parameter set. When the CTU size is greater than a predefined maximum allowable minimum luma coding block size, the predefined maximum allowable minimum luma coding block size is used as the upper limit of the range of allowable minimum luma coding block sizes. When the CTU size is smaller than the predefined maximum allowable minimum luma coding block size, the CTU size is used as the upper limit of the range of allowable minimum luma coding block sizes.

In an embodiment, the first syntax element indicates a binary logarithm value of the minimum luma coding block size minus 2. The circuitry is further configured to verify whether the binary logarithm value of the minimum luma coding block size minus 2 is in a range of 0 to N, inclusive. N is an integer, and N+2 represents a binary logarithm value of a predefined maximum allowable minimum luma coding block size.

In an embodiment, the first syntax element indicates a binary logarithm value of the minimum luma coding block size minus 2, and the circuitry is further configured to verify whether the binary logarithm value of the minimum luma coding block size minus 2 is in a range of 0 to Min(N, log 2_ctu_size_minus5+3), inclusive. N is an integer, N+2 represents a binary logarithm value of a predefined maximum allowable minimum luma coding block size, and log 2_ctu_size_minus5+5 represents a binary logarithm value of a CTU size of the coded video. In an embodiment, N equals 4.

In an embodiment, the first syntax element indicates a binary logarithm value of the minimum luma coding block size minus 2, and the circuitry is further configured to verify whether the binary logarithm value of the minimum luma coding block size is greater than Min(N+2, log 2_ctu_size). N is an integer, N+2 represents a binary logarithm value of a predefined maximum allowable minimum luma coding block size, and log 2_ctu_size represents a binary logarithm value of a CTU size of the coded video. In an embodiment, N equals 4.

In an embodiment, the first syntax element indicates a binary logarithm value of the minimum luma coding block size minus 2, and the circuitry is further configured to verify whether the binary logarithm value of the minimum luma coding block size minus 2 is in a range of 0 to log 2_ctu_size_minus5+M, inclusive. M is an integer, log 2_ctu_size_minus5+S represents a binary logarithm value of a CTU size of the coded video, and log 2_ctu_size minus5+M+2 represents a binary logarithm value of a predefined maximum allowable minimum luma coding block size.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 15 shows multi-type tree splitting modes.

FIG. 19 shows redundant splitting patterns of binary tree split and ternary tree split cases.

DETAILED DESCRIPTION OF EMBODIMENTS

I. Video Encoder and Decoder Systems

Figure 1:
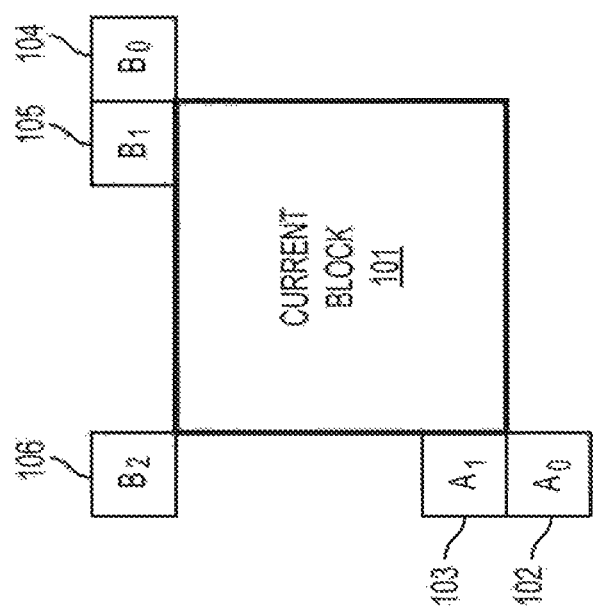
FIG. 1 is a schematic illustration of a current block and its surrounding spatial merge candidates in one example.
Figure 2:
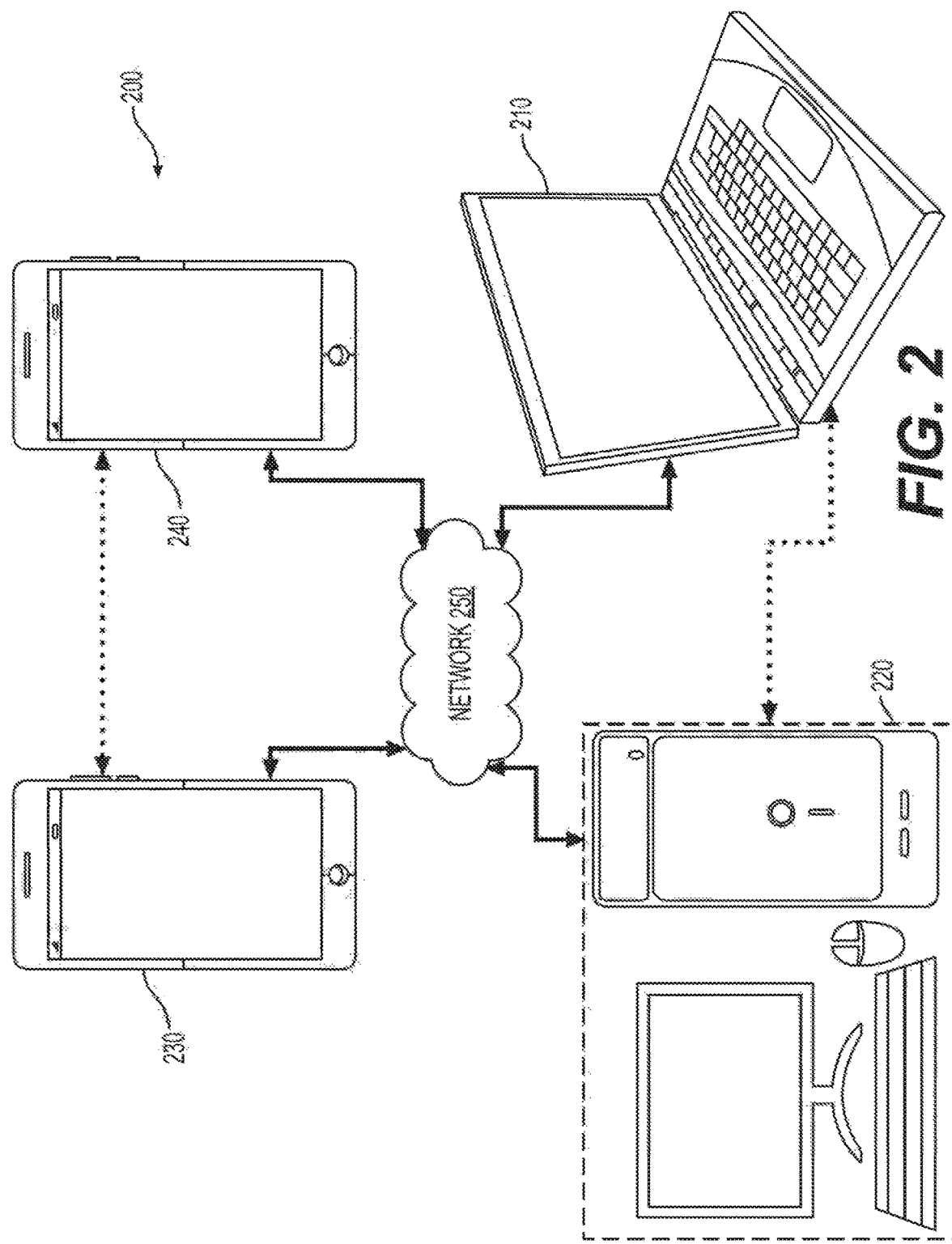
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250) decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

Figure 3:
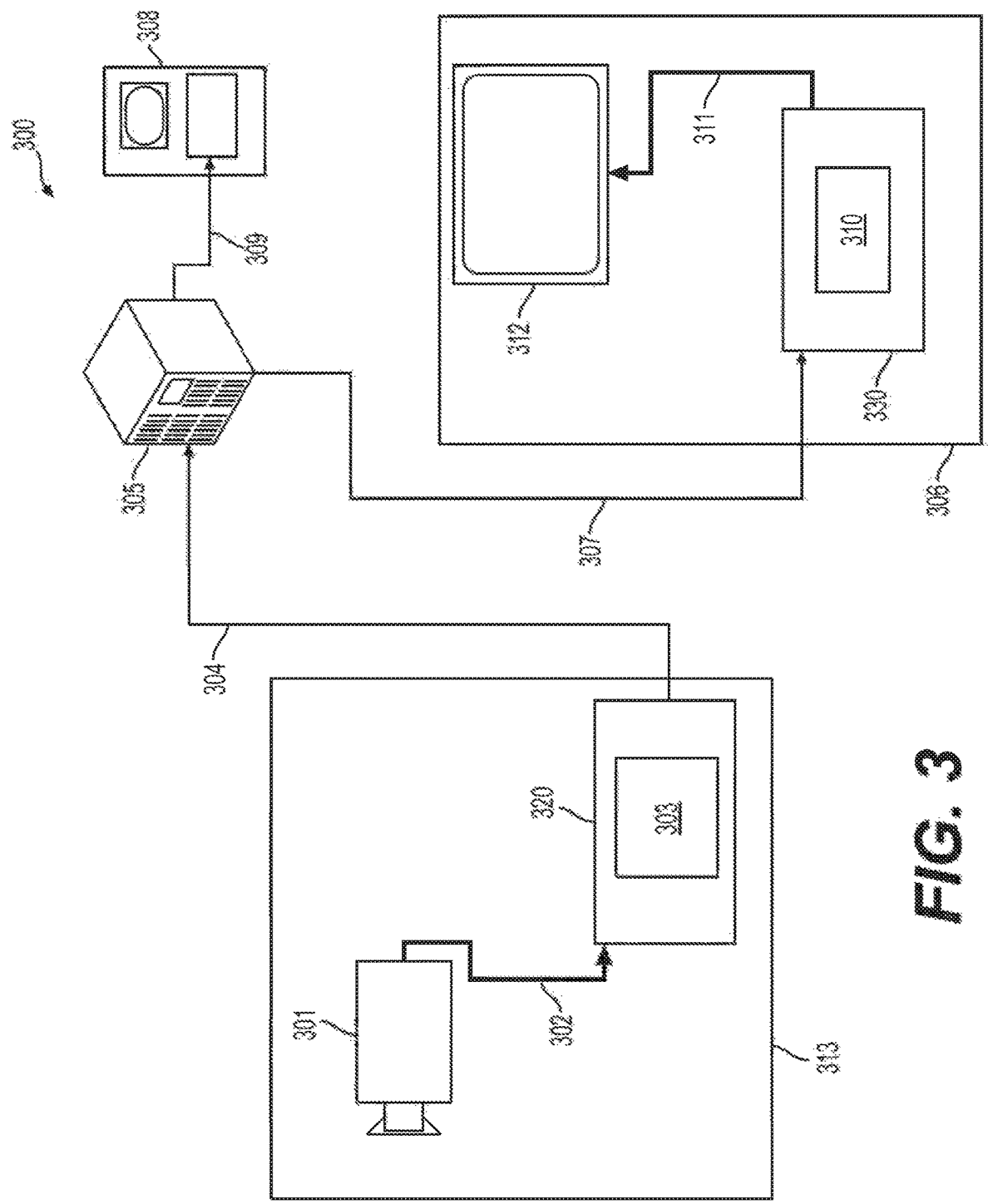
FIG. 3 is a schematic illustration of a simplified block diagram of a communication system (300) in accordance with an embodiment.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304)(or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304)(or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309)(e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
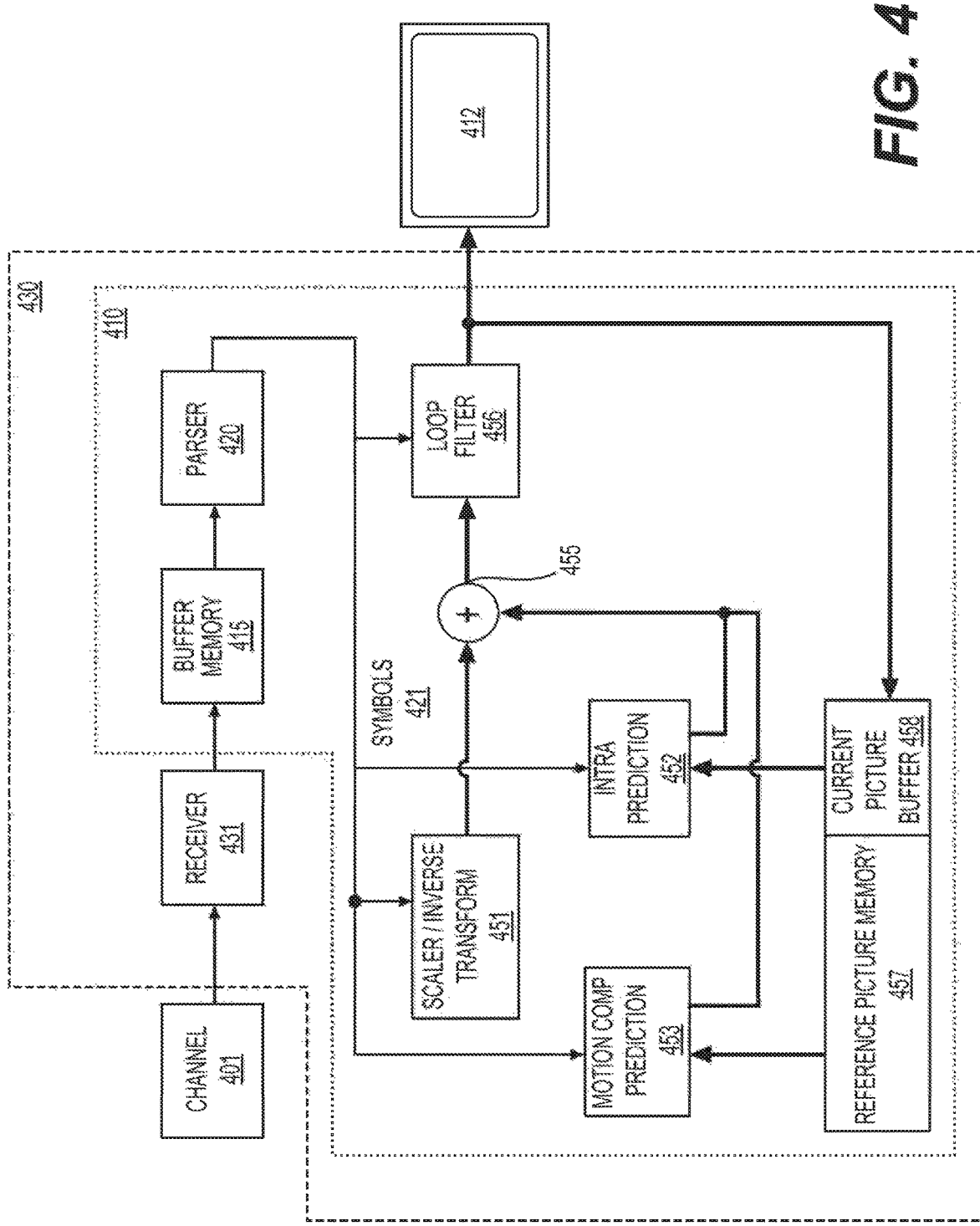
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431)(e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412)(e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s)(421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
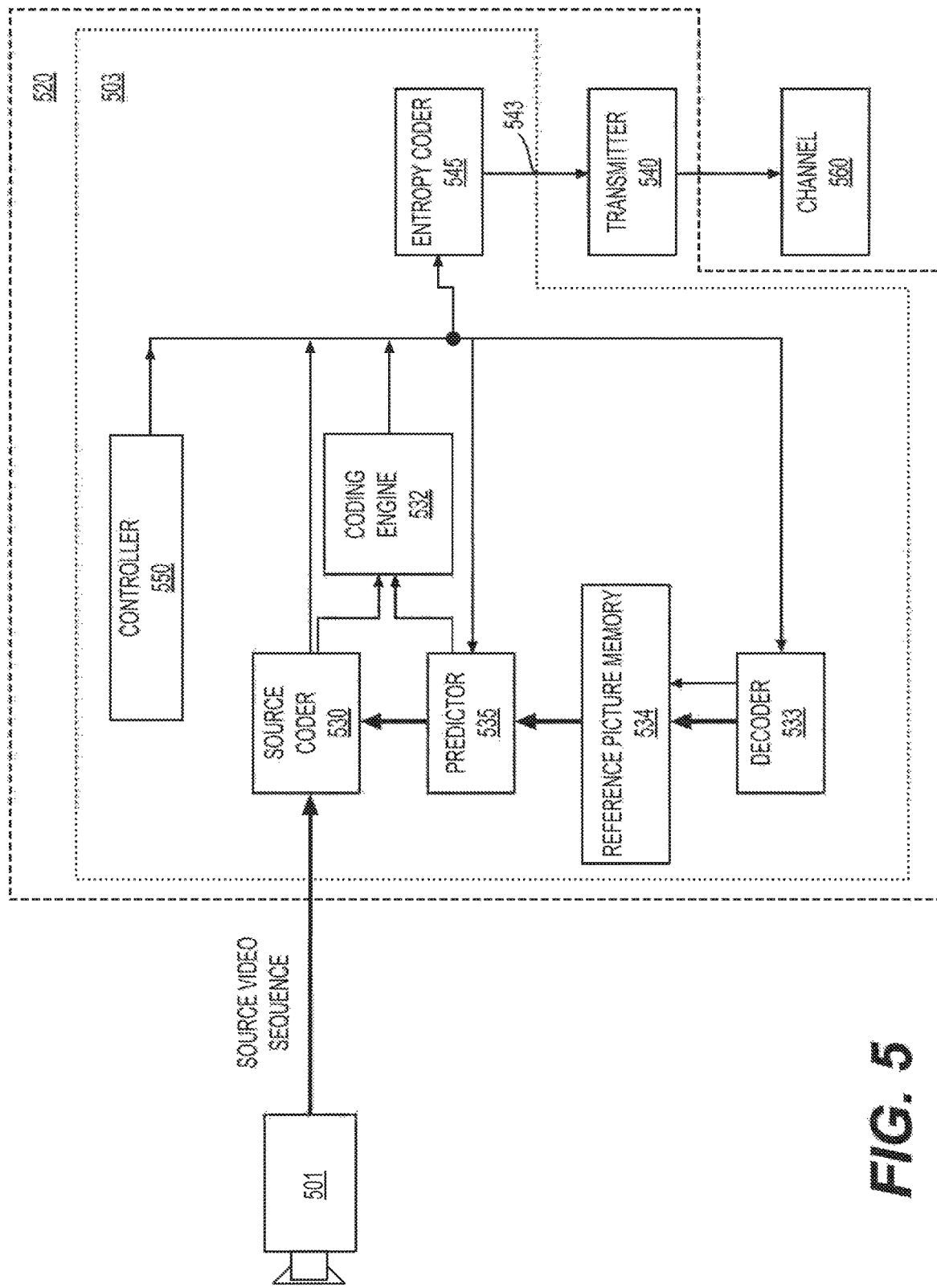
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540)(e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. Ina videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530)(e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
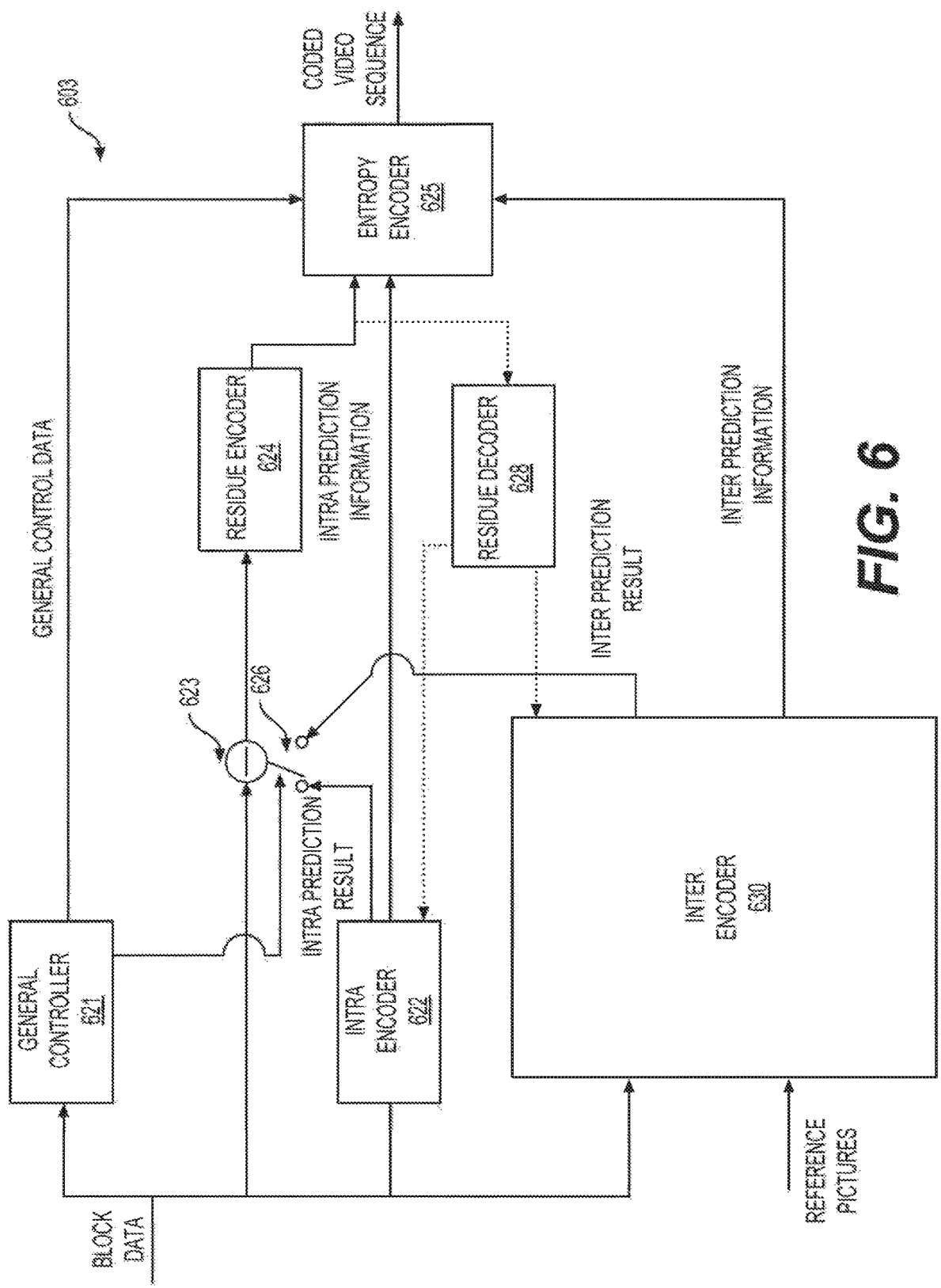
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
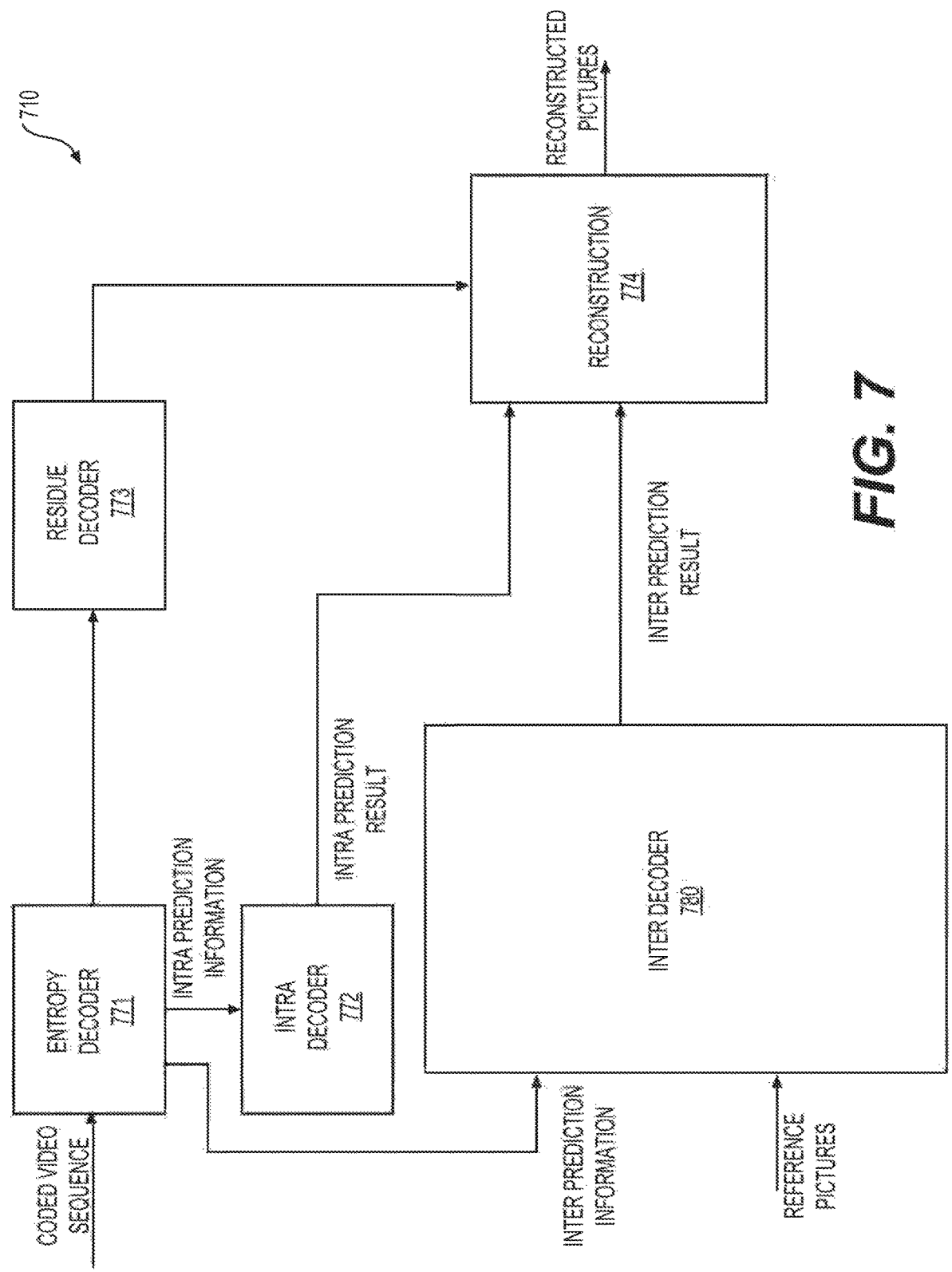
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions, II. Picture Formats and Picture Partitioning II.1 Source, Decoded and Output Picture Formats In some embodiments, the relationship between source and decoded pictures is given via a bitstream as follows. A video source that is represented by the bitstream is a sequence of pictures in decoding order. The source and decoded pictures are each comprised of one or more sample arrays:

Luma (Y) only (monochrome).
Luma and two chroma (YCbCr or YCgCo).
Green, blue, and red (GBR, also known as RGB).
Arrays representing other unspecified monochrome or tri-stimulus color samplings (for example, YZX, also known as XYZ).

For convenience of notation and terminology in this disclosure, the variables and terms associated with these arrays are referred to as luma (or L or Y) and chroma, where the two chroma arrays are referred to as Cb and Cr, regardless of the actual color representation method in use. The actual color representation method in use can be indicated by syntax.

The variables SubWidthC and SubHeightC indicates chroma component subsampling ratios, and are specified in Table 1, depending on the chroma format sampling structure, which is specified through chroma_format_idc and separate_color_plane_flag.

TABLE 1

| chroma_format_idc | separate_color_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array. In 4:2:0 sampling, each of the two chroma arrays has half the height and half the width of the luma array. In 4:2:2 sampling, each of the two chroma arrays has the same height and half the width of the luma array. In 4:4:4 sampling, depending on the value of separate_color_plane_flag, the following applies:

- If separate_color_plane_flag is equal to 0, each of the two chroma arrays has the same height and width as the luma array.
- Otherwise (separate_color_plane_flag is equal to 1), the three color planes are separately processed as monochrome sampled pictures.

Figure 8:
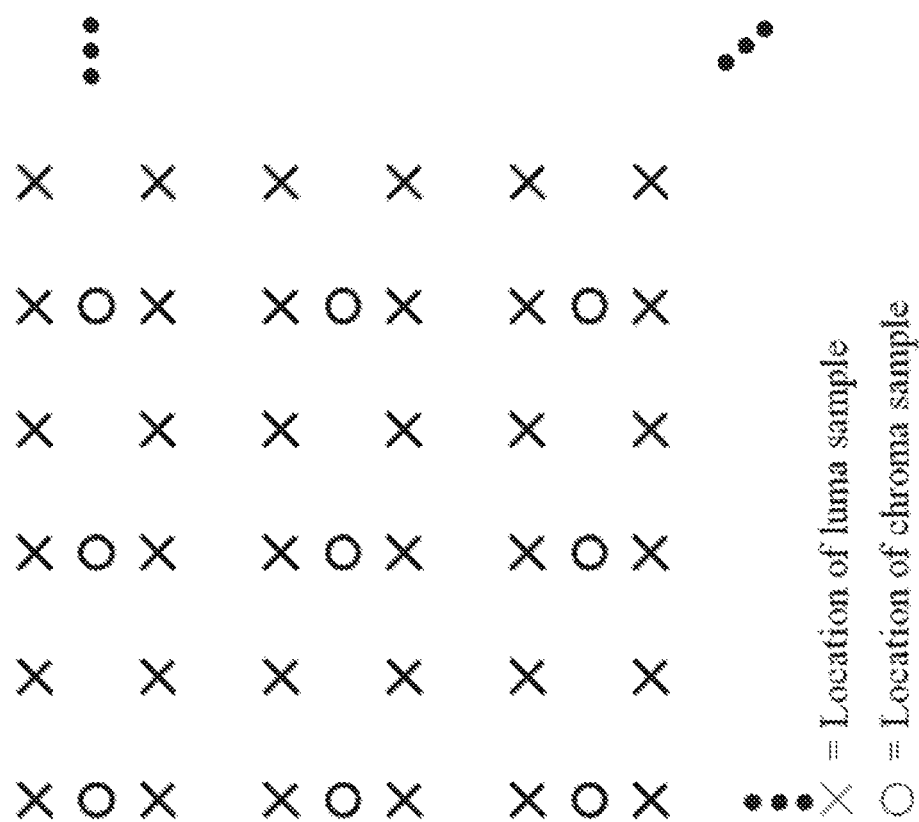
FIG. 8 shows vertical and horizontal locations of 4:2:0 luma and chroma samples in a picture.

The number of bits necessary for the representation of each of the samples in the luma and chroma arrays in a video sequence can be, for example, in the range of 8 to 16, inclusive, and the number of bits used in the luma array may differ from the number of bits used in the chroma arrays. When the value of chroma_format_idc is equal to 1, the nominal vertical and horizontal relative locations of luma and chroma samples in pictures are shown in FIG. 8. Alternative chroma sample relative locations may be indicated in video usability information.

Figure 9:
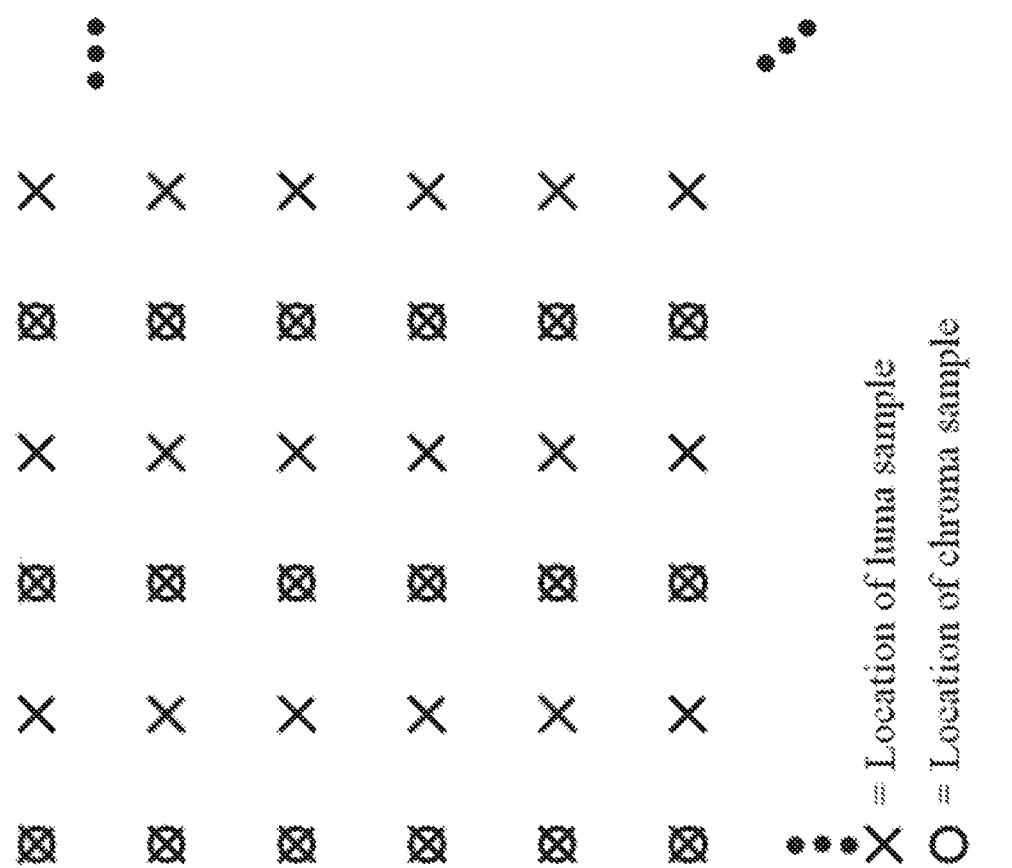
FIG. 9 shows vertical and horizontal locations of 4:2:2 luma and chroma samples in a picture.
Figure 10:
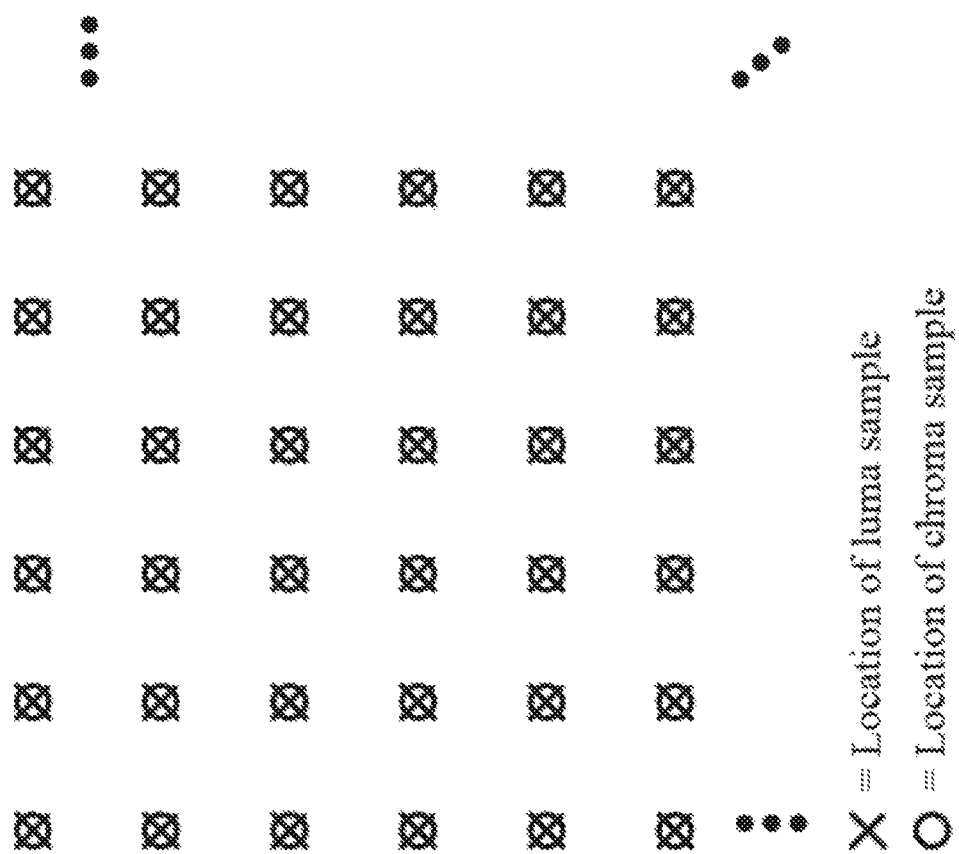
FIG. 10 shows vertical and horizontal locations of 4:4:4 luma and chroma samples in a picture.

When the value of chroma_format_idc is equal to 2, the chroma samples are co-sited with the corresponding luma samples and the nominal locations in a picture are as shown in FIG. 9. When the value of chroma_format_idc is equal to 3, all array samples are co-sited for all cases of pictures and the nominal locations in a picture are as shown in FIG. 10.

II.2 Picture Partitioning

II.2.1 Partitioning of the Picture into CTUs

Figure 11:
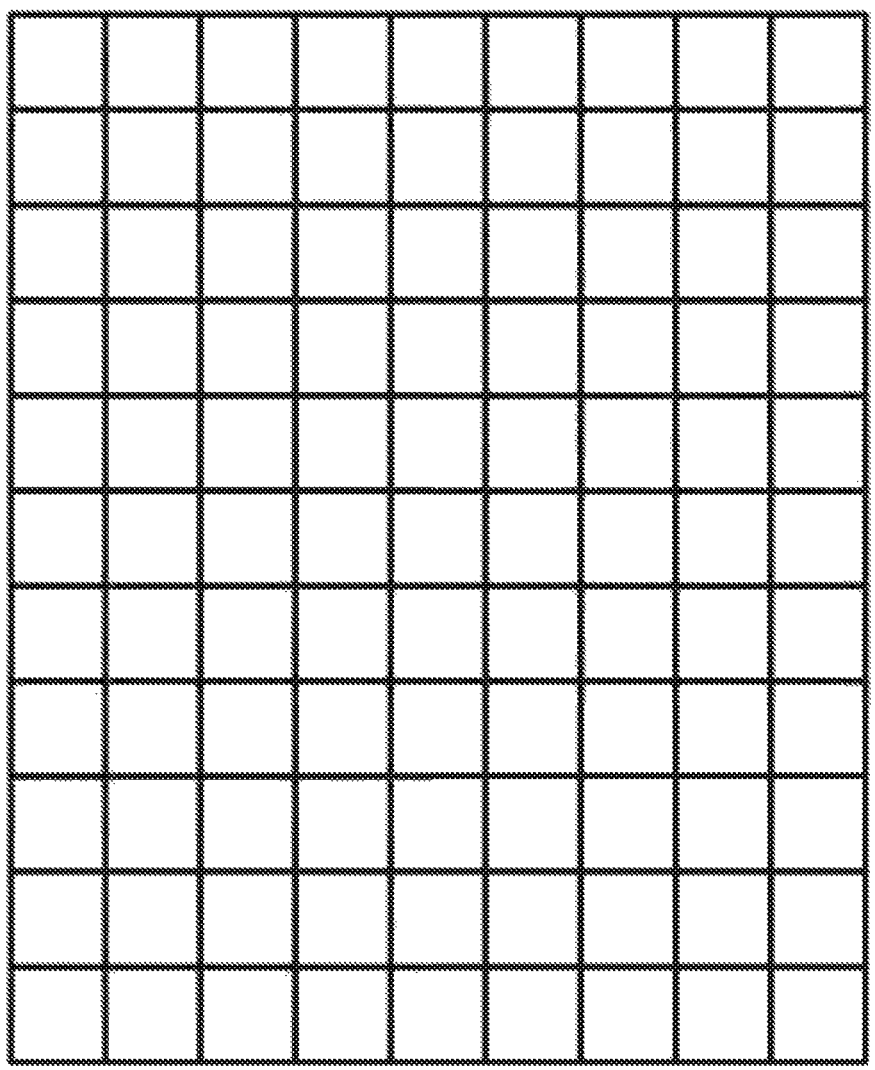
FIG. 11 shows an example of a picture divided into coding tree units (CTUs).

In some embodiments, pictures are divided into a sequence of coding tree units (CTUs). The CTU concept is similar to that of the HEVC. For a picture that has three sample arrays, a CTU consists of an N×N block of luma samples together with two corresponding blocks of chroma samples. FIG. 11 shows the example of a picture divided into CTUs. The maximum allowed size of the luma block in a CTU is specified to be 128λ128 in an example. In an example, the maximum size of the luma transform blocks is 64×64).

II.2.2 Partitioning of Pictures into Slices, Tiles, and Bricks

In some embodiments, a picture can be divided into one or more tile rows and one or more tile columns. A tile is a sequence of CTUs that covers a rectangular region of a picture. A tile is divided into one or more bricks, each of which consisting of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile. Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 12:
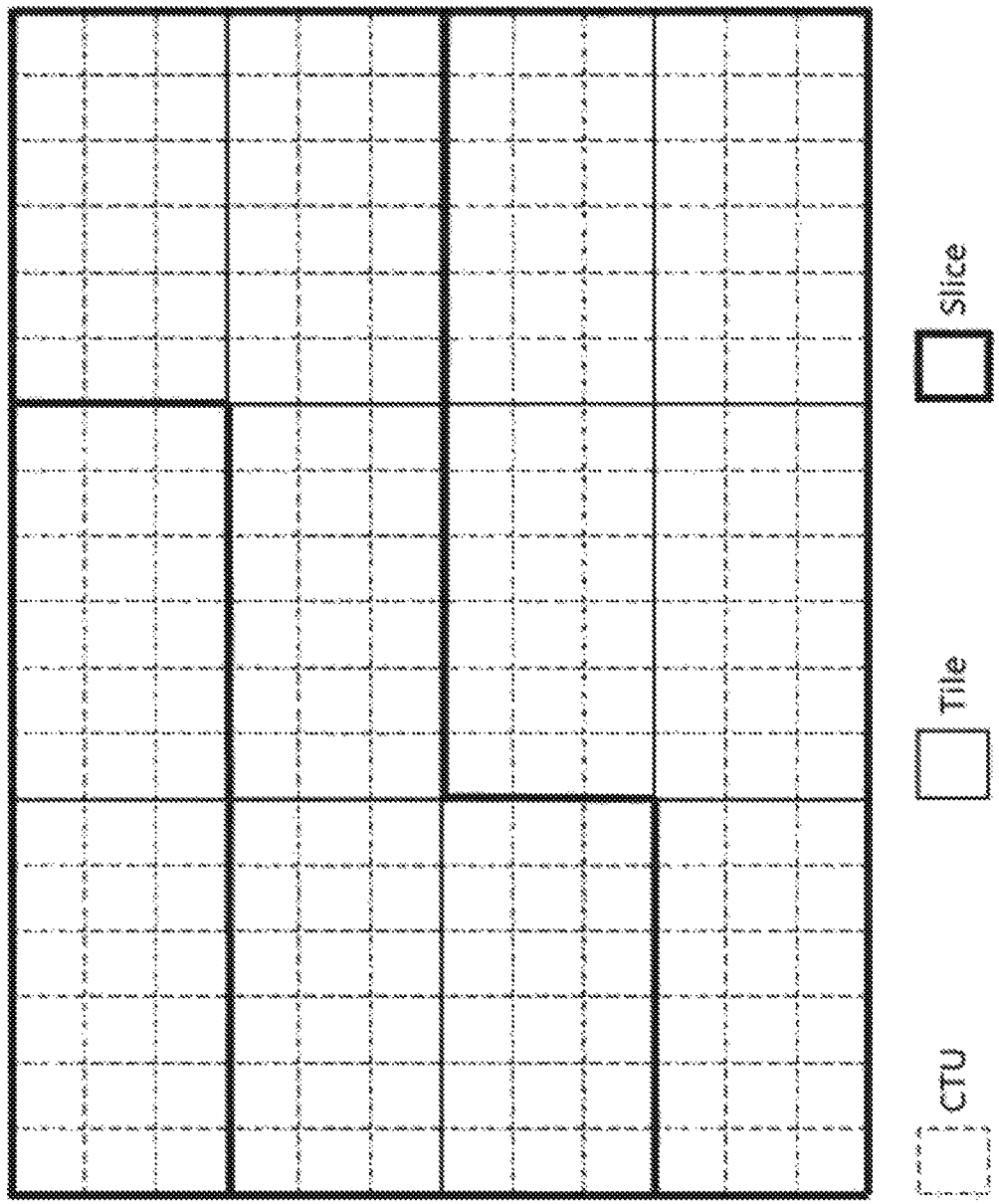
FIG. 12 shows an example of a picture partitioned into tiles and raster-scan slices.
Figure 13:
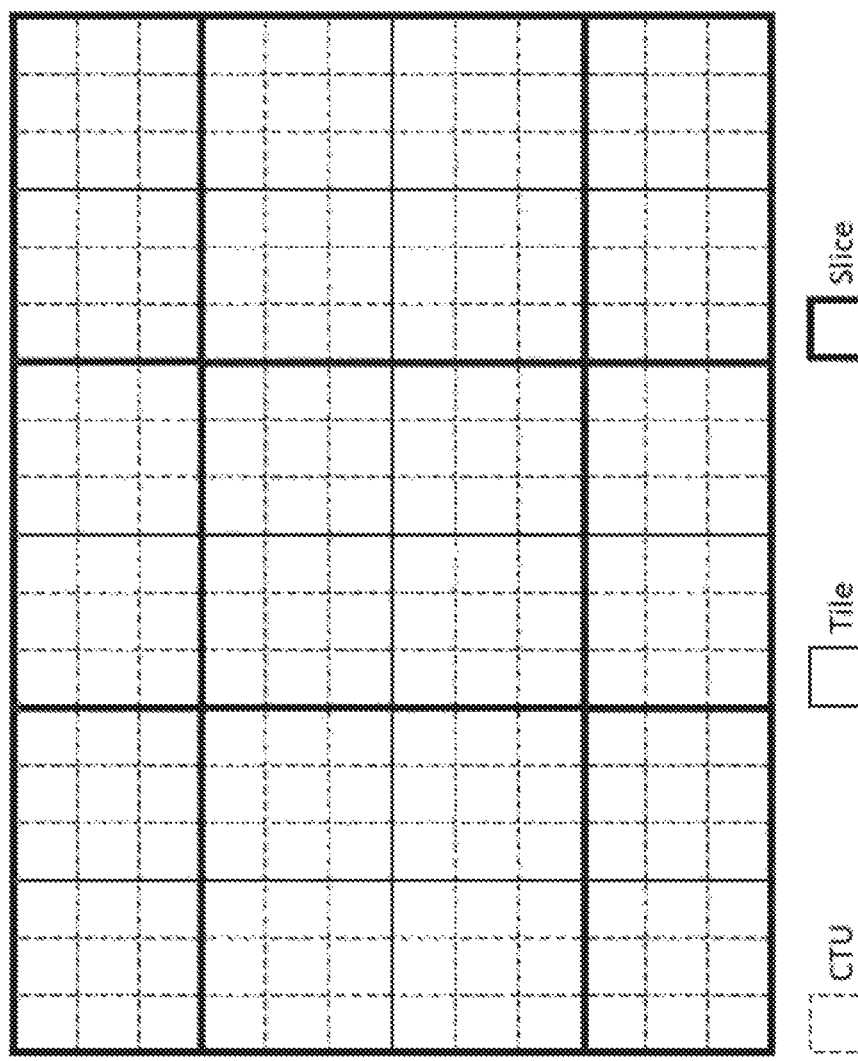
FIG. 13 shows an example of a picture partitioned into tiles and rectangular slices.
Figure 14:
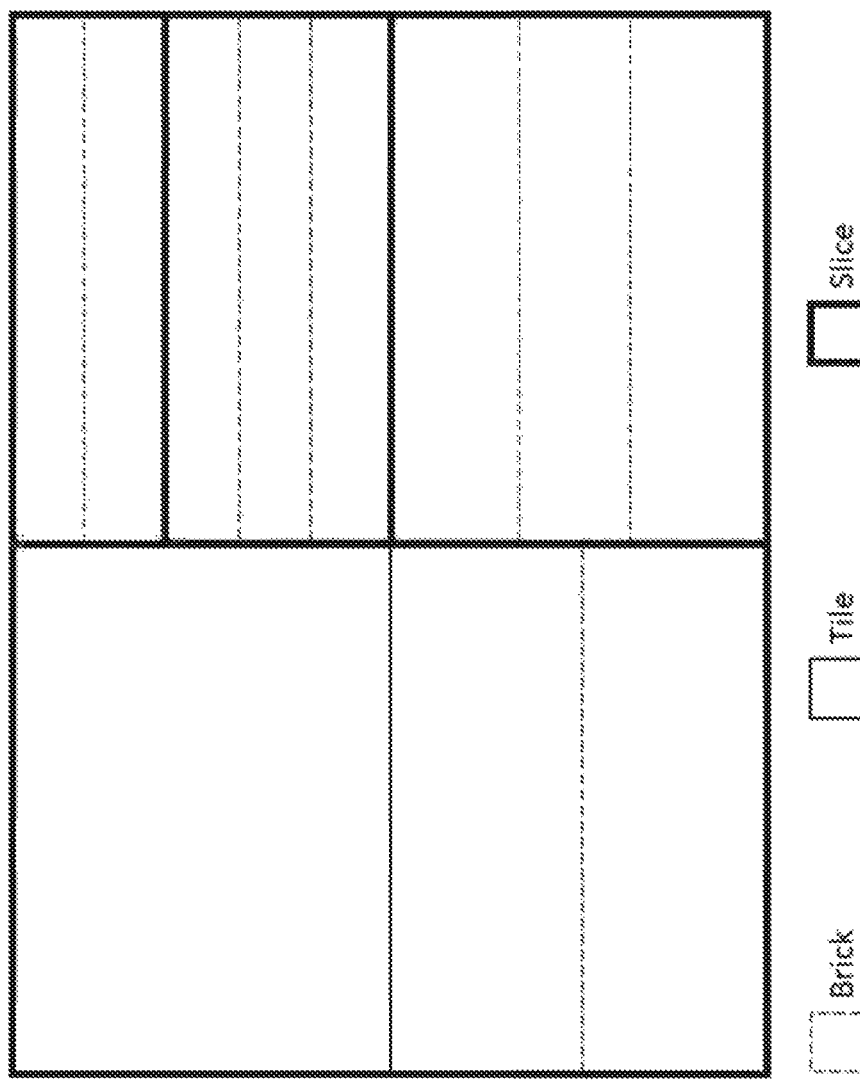
FIG. 14 shows an example of a picture partitioned into tiles, bricks, and rectangular slices.

FIG. 12 shows an example of raster-scan slice partitioning of a picture, where the picture is divided into 12 tiles and 3 raster-scan slices. FIG. 13 shows an example of rectangular slice partitioning of a picture, where the picture is divided into 24 tiles (6 tile columns and 4 tile rows) and 9 rectangular slices. FIG. 14 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

II.2.3 Partitioning of the CTUs Using a Tree Structure

In some embodiments, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In some embodiments, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure.

As shown in FIG. 15, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU.

Figure 16:
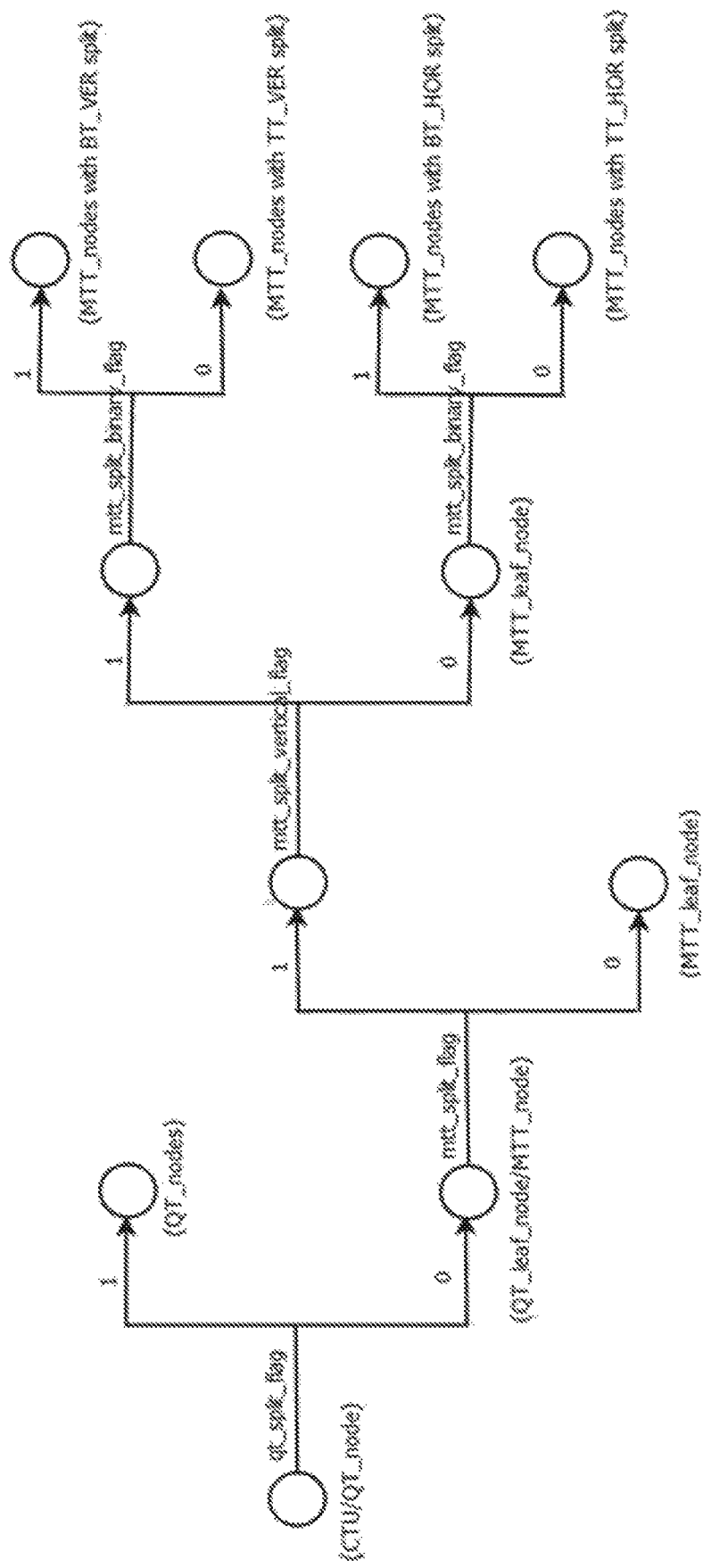
FIG. 16 shows splitting flags signaling in quadtree with nested multi-type tree coding tree structure.

FIG. 16 illustrates the signaling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mttsplit_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 2.

TABLE 2

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 17:
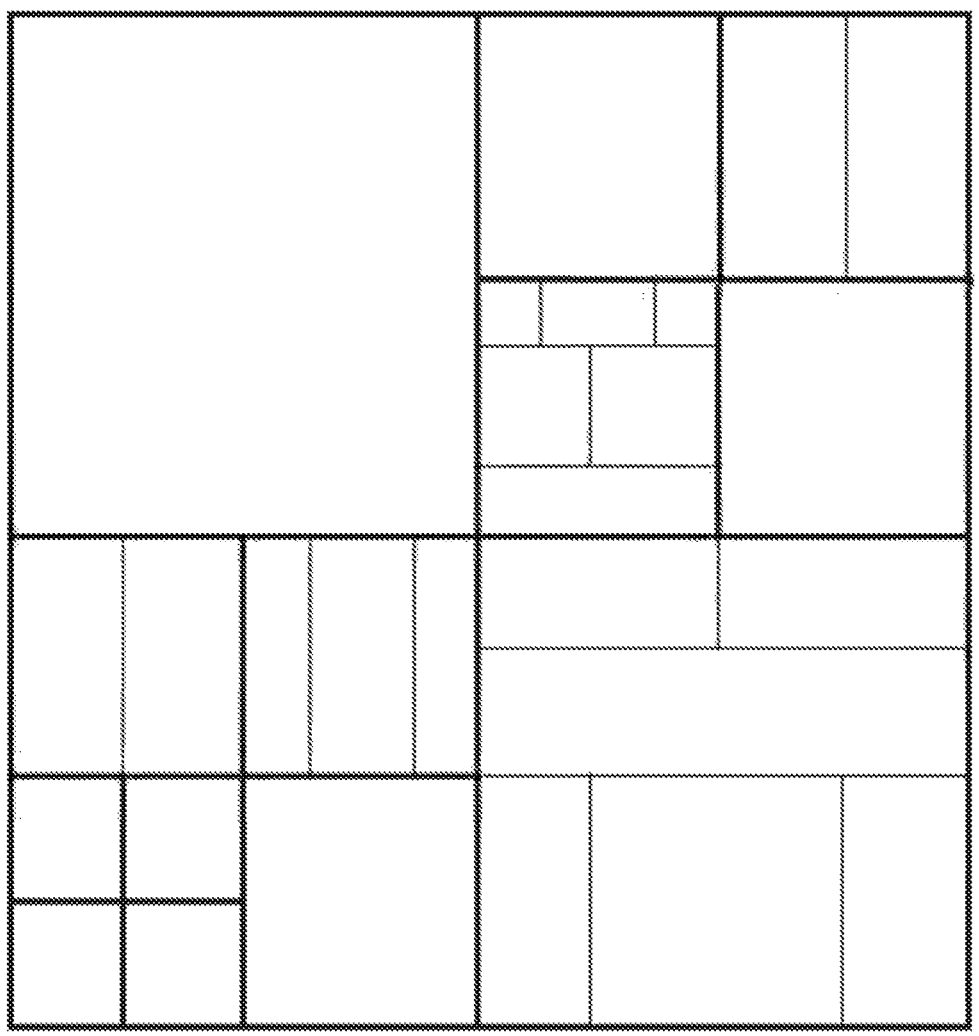
FIG. 17 shows an example of quadtree with nested multi-type tree coding block structure.

FIG. 17 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In some embodiments, the maximum supported luma transform size is 6464 and the maximum supported chroma transform size is 32×32. When the width or height of the CB is larger the maximum transform width or height, the CB is automatically split in the horizontal and/or vertical direction to meet the transform size restriction in that direction.

In some embodiments, the following parameters are defined and specified by a syntax parameter set (SPS) syntax elements for the quadtree with nested multi-type tree coding tree scheme.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leafnodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree.

Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTiSize, no further horizontal splitting is considered. Similarly, when the multi-type tree node has height equal to MinBtSize and smaller or equal to 2*MinTtSize, no further vertical splitting is considered.

Figure 18:
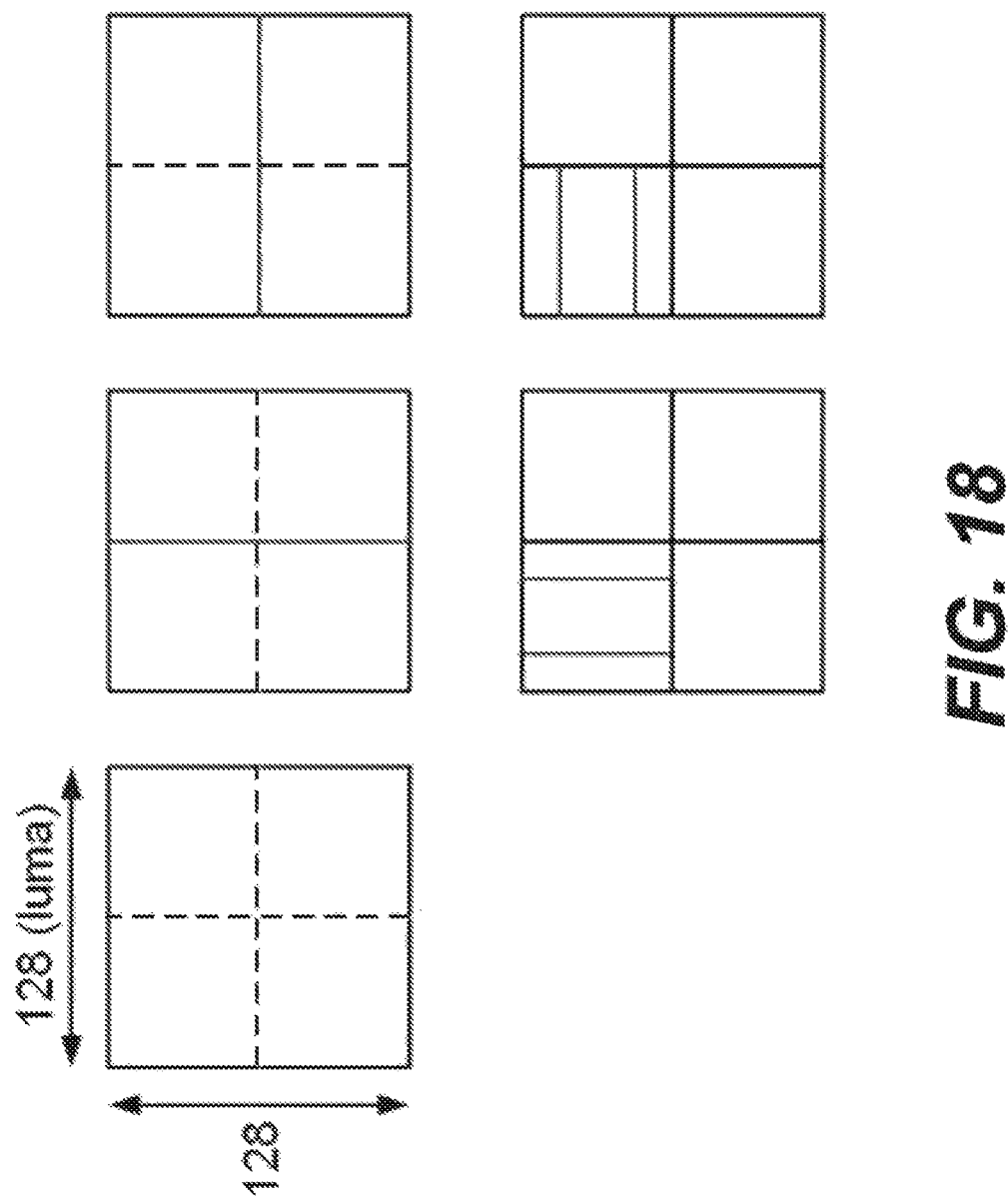
FIG. 18 shows examples where no ternary tree (TT) split for 128×128 coding block is performed.

In some embodiments, to allow 6064 Luma block and 32×32 Chroma pipelining design in some hardware decoders, TT split is forbidden when either width or height of a luma coding block is larger than 64, as shown in FIG. 18. TT split is also forbidden when either width or height of a chroma coding block is larger than 32.

In some embodiments, the coding tree scheme supports the ability for the luma and chroma to have a separate block tree structure. For example, for P and B slices, the luma and chroma CTBs in one CTU can share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

II.2.4 CU Splits on Picture Boundaries

In some embodiments, when a portion of a tree node block exceeds the bottom or right picture boundary, the tree node block is forced to be split until the all samples of every coded CU are located inside the picture boundaries. The following splitting rules are applied in some embodiments.

If a portion of a tree node block exceeds both the bottom and the right picture boundaries: (i) if the block is a QT node and the size of the block is larger than the minimum QT size, the block is forced to be split with QT split mode; otherwise, the block is forced to be split with SPLIT_BT_HOR mode (ii) Otherwise, if a portion of a tree node block exceeds the bottom picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_HOR mode.

Otherwise (the block is a BTT node or the size of the block is smaller than or equal to the minimum QT size), the block is forced to be split with SPLIT_BT_HOR mode.

(iii) Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

II.2.5 Restrictions on Redundant CU Splits

The quadtree with nested multi-type tree coding block structure provides a highly flexible block partitioning structure. Due to the types of splits supported the multi-type tree, different splitting patterns could potentially result in the same coding block structure. In some embodiments, some of these redundant splitting patterns are disallowed.

FIG. 19 illustrates the redundant splitting patterns of binary tree splits and ternary tree splits. As shown, two levels of consecutive binary splits in one direction could have the same coding block structure as a ternary tree split followed by a binary tree split of the central partition. In this case, the binary tree split (in the given direction) for the central partition of a ternary tree split is prevented by the syntax. This restriction applies for CUs in all pictures.

When the splits are prohibited as described above, signaling of the corresponding syntax elements is modified to account for the prohibited cases. For example, when any case in FIG. 19 is identified (i.e. the binary split is prohibited for a CU of a central partition), the syntax element mtt_split_cu_binary_flag which specifies whether the split is a binary split or a ternary split is not signaled and is instead inferred to be equal to 0 by the decoder.

II.2.6 Virtual Pipeline Data Units (VPDUs)

In some embodiments, virtual pipeline data units (VPDUs) are employed. VPDUs are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In some hardware decoders, the VPDU size can be set to maximum transform block (TB) size. However, in some scenarios, ternary tree (TT) and binary tree (BT) partition may lead to the increasing of VPDUs size.

Figure 20:
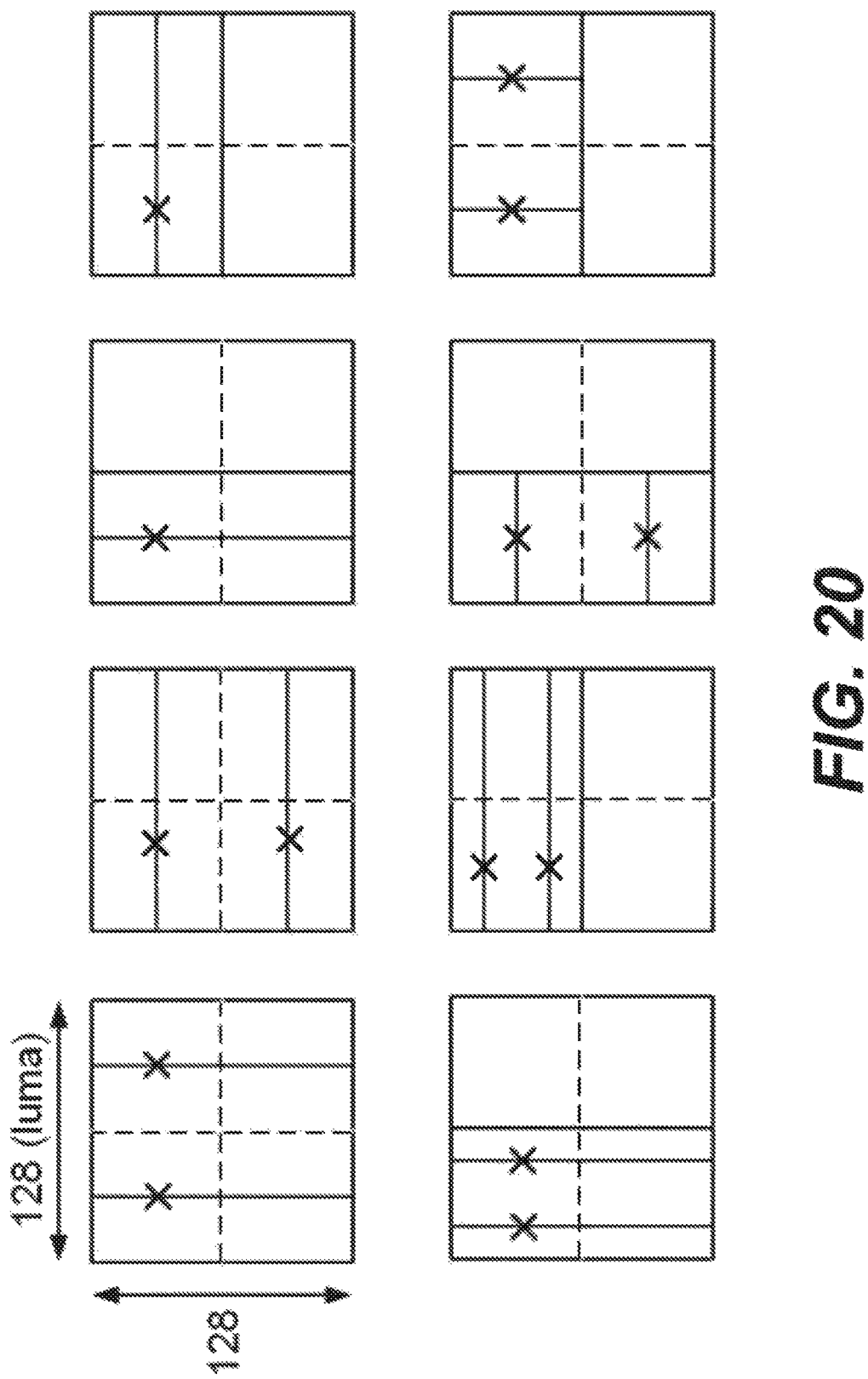
FIG. 20 shows examples of disallowed TT and binary tree (BT) partitioning.

In order to keep the VPDU size as 64×64 luma samples, the following normative partition restrictions (with syntax signaling modification) are applied in some examples, as shown in FIG. 20: TT split is not allowed for a CU with either width or height, or both width and height equal to 128. For a 128×N CU with N≤64 (i.e. width equal to 128 and height smaller than 128), horizontal BT is not allowed. For an N×128 CU with N≤64 (i.e. height equal to 128 and width smaller than 128), vertical BT is not allowed.

II.2.7 Intra Chroma Partitioning and Prediction Restriction

Since the dual tree in intra picture allows to apply different partitioning in the chroma coding tree compared to the luma coding tree, the dual tree introduces longer coding pipeline and the QTBT MinQTSizeC value range and MinBtSizeY and MinTTSizeY in chroma tree allow small chroma blocks such as 2×2, 4×2, and 2×4. It causes difficulties in decoder design. Moreover, several prediction modes such as CCLM, planar and angular mode needs multiplication. In order to alleviate the above mentioned issues, small chroma block sizes (2×2/2×4/4×2) are restricted in dual tree as a partitioning restriction in some embodiments.

In typical hardware video encoders and decoders, processing throughput drops when a picture has more small intra blocks because of sample processing data dependency between neighboring intra blocks. The predictor generation of an intra block requires top and left boundary reconstructed samples from neighboring blocks. Therefore, intra prediction has to be sequentially processed block by block.

In some coding technologies, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed.

In some embodiments, in order to improve worst case throughput, chroma intra CBs smaller than 16 chroma samples is disallowed by constraining the partitioning of chroma intra CBs. In single coding tree, a smallest chroma intra prediction unit (SCIPU) is defined as a coding tree node whose chroma block size is larger than or equal to 16 chroma samples and has at least one child luma block smaller than 64 luma samples. It is required that in each SCIPU, all CBs are inter, or all CBs are non-inter, i.e, either intra or intra block copy (IBC). In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed.

In addition, chroma scaling is not applied in case of a non-inter SCIPU. Here, no additional syntax is signaled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU. In addition, a restriction on picture size is considered to avoid 2×2/2×4/4×2 intra chroma blocks at the corner of pictures by considering the picture width and height to be multiple of max (8, MinCbSizeY).

II.3 Partitioning and Block Size Related Syntax in SPS
Table 3 is an example SPS syntax table.

TABLE 3

|  | Descriptor |
|---|---|
| seq_parameter_set_rbsp( ) { | |
| ... | |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_cb_intra_slice_luma | ue(v) |
|     sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | |
|     } | |
|   } | |
|   sps_max_luma_transform_size_64_flag | u(1) |
|   sps_joint_cber_enabled_flag | u(1) |
| ... | |
| } | |

II.4 Partitioning and Block Size Related Semantics

As examples, semantics of some syntax elements related with partitioning and block size are described below. For example, the syntax elements can be included in a SPS and applied to pictures referring to the SPS.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log 2_min_luma_coding_block_size_minus2 plus 2 specifies the minimum luma coding block size. The value range of log 2_min_luma_coding_block_size_minus2 shall be in the range of 0 to log 2_ctu_size_minus5+3, inclusive.

The variables MinCb Log 2SizeY, MinCbSizeY, IbcBufWidthY, IbcBufWidthC and Vsize are derived as follows:

$$\text{MinCb Log 2SizeY} = \text{log 2\_min\_luma\_coding\_block\_size\_minus2} + 2 \quad \text{(Eq. 2-1)}$$

$$\text{MinCbSizeY} = 1 << \text{MinCb Log 2SizeY} \quad \text{(Eq. 2-2)}$$

$$\text{IbcButWidthY} = 256 * 128 / \text{CtbSizeY} \quad \text{(Eq. 2-3)}$$

$$\text{IbcBufWidthC} = \text{IbcBufWidthY} / \text{SubWidthC} \quad \text{(Eq. 2-4)}$$

$$V\text{Size} = \text{Min}(64, \text{CtbSizeY}) \quad \text{(Eq. 2-5)}$$

The value of MinCbSizeY shall less than or equal to VSize.

The variables CtbWidthC and CtbHeightC, which specify the width and height, respectively, of the array for each chroma CTB, are derived as follows:

If chroma_format_idc is equal to 0 (monochrome) or separate_color_plane_flag is equal to 1, CtbWidthC and CtbHeightC are both equal to 0.

Otherwise, CtbWidthC and CtbHeightC are derived as follows:

$$\text{CtbWidth}C = \text{CtbSize}Y / \text{SubWidth}C \quad \text{(Eq. 2-6)}$$

$$\text{Ctbheight}C = \text{CtbSize}Y / \text{SubHeight}C \quad \text{(Eq. 2-7)}$$

For log 2BlockWidth ranging from 0 to 4 and for log 2BlockHeight ranging from 0 to 4, inclusive, an up-right diagonal and raster scan order array initialization process can be invoked with 1<<log 2BlockWidth and 1<<log 2BlockHeight as inputs, and the output is assigned to DiagScanOrder[log 2BlockWidth][log 2BlockHeight] and Raster2DiagScanPos[log 2BlockWidth][log 2BlockHeight].

For log 2BlockWidth ranging from 0 to 6 and for log 2BlockHeight ranging from 0 to 6, inclusive, the horizontal and vertical traverse scan order array initialization process can be invoked with 1<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by pic_log 2_diff_min_qt_min_cb_luma present in PHs referring to the SPS. The value of sps_log 2_diff_min_qt_min_cb_intra_slice_luma shall be in the range of 0 to Ctb Log 2SizeY−MinCb Log 2SizeY, inclusive. The base 2 logarithm of the minimum size in luma samples of a luma leaf block resulting from quadtree splitting of a CT is derived as follows:

$$MinQt\ Log\ 2SizeIntraY = sps\_log\ 2\_diff\_min\_qt\_min\_cb\_intra\_slice\_luma + MinCb\ Log\ 2SizeY \quad (Eq.\ 2\text{-}8)$$

sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by pic_log 2_diff_min_qt_min_cb_luma present in PHs referring to the SPS. The value of sps_log 2_diff_min_qt_min_cb_inter_slice shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

$$MinQt\ Log\ 2SizeInterY = sps\_log\ 2\_diff\_min\_qt\_min\_cb\_inter\_slice + MinCb\ Log\ 2SizeY \quad (Eq.\ 2\text{-}9)$$

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by pic_max_mtt_hierarchy_depth_inter_slice present in picture headers (PHs) referring to the SPS. The value of sps_max_mtt_hierarchy_depth_inter slice shall be in the range of 0 to 2*(Ctb Log 2SizeY−MinCb Log 2SizeY) inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by pic_max_mtt_hierarchy_depth_intra_slice_luma present in PHs referring to the SPS. The value of sps_max_mtt_hierarchy_depth_intra_slice_luma shall be in the range of 0 to 2*(Ctb Log 2SizeY−MinCb Log 2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by pic_log 2_dif_max_bt_min_qt_luma present in PHs referring to the SPS. The value of sps_log 2_diff_max_bt_inqt_intra_slice_luma shall be in the range of 0 to Ctb Log 2SizeY−MinQt Log 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by pic_log 2_diff_max_tt_min_qt_luma present in PHs referring to the SPS. The value of sps_log 2_diff_max_tt_min_qt_intra_slice_luma shall be in the range of 0 to Ctb Log 2SizeY−MinQt Log 2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 0 (B) or 1 (P) referring to the SPS. When partition_constraints_override_enabled_flag is equal to 1, the default difference can be overridden by pic_log 2_diff_max_bt_min_qt_luma present in PHs referring to the SPS. The value of sps_log 2_diff_max_bt_min_qt_inter_slice shall be in the range of 0 to Ctb Log 2SizeY−MinQ Log 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by pic_log 2_diff_max_tt_min_qt_luma present in PHs referring to the SPS. The value of sps_log 2_diff_max_tt_min_qt_inter_slice shall be in the range of 0 to Ctb Log 2SizeY−MinQt Log 2SizeInterY, inclusive. When sps_log 2_diff_max_tt_min_qt_inter_slice is not present, the value of sps_log 2_diff_max_tt_min_qt_inter_slice is inferred to be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2(I) referring to the SPS. When partition_constraints_override_enabled_flag is equal to 1, the default difference can be overridden by pic_log 2_diff_min_qt_min_cb_chroma present in PHs referring to the SPS. The value of sps_log 2_diff_min_qt_min_cb_intra_slice_chroma shall be in the range of 0 to Ctb Log 2SizeY−MinCb Log 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$\text{MinQt Log 2SizeIntra}C = \text{sps\_log 2\_diff\_min\_qt\_min\_cb\_intra\_slice\_chroma} + \text{MinCb Log 2Size}Y \quad \text{(Eq. 2-10)}$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by pic_max_mtt_hierarchy_depth_chroma present in PHs referring to the SPS. The value of sps_max_mtthierarchy_depth_intra_slice_chroma shall be in the range of 0 to 2*(Ctb Log 2SizeY−MinCb Log 2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by pic_log 2_diff_max_bt_in_qt_chroma present in PHs referring to the SPS. The value of sps_log 2_diff_max_bt_min_qt_intra_slice_chroma shall be in the range of 0 to Ctb Log 2SizeY−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by pic_log 2_diff_max_tt_min_qt_chroma present in PHs referring to the SPS. The value of sps_log 2_diff_max_tt_mint_intra_slice_chroma shall be in the range of 0 to Ctb Log 2SizeY−MinQt Log 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTb Log 2SizeY, MaxTb Log 2SizeY, MinTbSizeY, and MaxTbSizeY are derived as follows:

$$\text{MinTb Log 2Size}Y = 2 \quad \text{(Eq. 2-11)}$$

$$\text{MaxTb Log 2Size}Y = \text{sps\_max\_luma\_transform\_size\_64\_flag} ? 6:5 \quad \text{(Eq. 2-12)}$$

$$\text{MinTbSize}Y = 1 << \text{MinTb Log 2Size}Y \quad \text{(Eq. 2-13)}$$

$$\text{MaxTbSize}Y = 1 << \text{MaxTb Log 2Size}Y \quad \text{(Eq. 2-14)}$$

pic_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of pic_log 2_diff_min_qt_min_cb_intra_slice_chroma shall be in the range of 0 to Ctb Log 2SizeY−MinCb Log 2SizeY, inclusive. When not present, the value of pic_log 2_diff_min_qt_min_cb_intra_slice_chmma is inferred to be equal to sps_log 2_diff_min_qt_min_cb_intra_slice_chroma.

slice_type specifies the coding type of the slice according to Table 4.

TABLE 4

| slice_type | Name of slice_type |
|---|---|
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice_type shall be equal to 2.

The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

$$\text{MinQtSize}Y = 1 << \text{MinQ Log 2Size}Y \quad \text{(Eq. 2-15)}$$

$$\text{MinQtSize}C = 1 << \text{MinQt Log 2Size}C \quad \text{(Eq. 2-16)}$$

$$\text{MinBtSize}Y = 1 << \text{MinCb Log 2Size}Y \quad \text{(Eq. 2-17)}$$

$$\text{MinTtSize}Y = 1 << \text{MinCb Log 2Size}Y \quad \text{(Eq. 2-18)}$$

(i) If slicetype equal to 2 (I), $$\text{MinQt Log 2Size}Y = \text{MinCb Log 2Size}Y + \text{pic\_log 2\_diff\_min\_qt\_min\_cb\_intra\_slice\_luma} \quad \text{(Eq. 2-19)}$$

$$\text{MinQt Log 2Size}C = \text{MinCb Log 2Size}C + \text{pic\_log 2\_diff\_min\_qt\_min\_cb\_intra\_slice\_chroma} \quad \text{(Eq. 2-20)}$$

$$\text{MaxBtSize}Y = 1 << (\text{MinQt Log 2Size}Y + \text{pic\_log 2\_diff\_max\_bt\_min\_qt\_intra\_slice\_luma}) \quad \text{(Eq. 2-21)}$$

$$\text{MaxBtSize}C = 1 << (\text{MinQt Log 2Size}C + \text{pic\_log 2\_diff\_max\_bt\_min\_qt\_intra\_slice\_chroma}) \quad \text{(Eq. 2-22)}$$

$$\text{MaxTtSize}Y = 1 << (\text{MinQt Log 2Size}Y + \text{pic\_log 2\_diff\_max\_tt\_min\_qt\_intra\_slice\_luma}) \quad \text{(Eq. 2-23)}$$

$$\text{MaxTtSize}C = 1 << (\text{MinQt Log 2Size}C + \text{pic\_log 2\_diff\_max\_tt\_min\_qt\_intra\_slice\_chroma}) \quad \text{(Eq. 2-24)}$$

MaxMttDepthY=pic_max_mtt_hierarchy_depth_intra_slice_luma (Eq. 2-25)

MaxMttDepthC=pic_max_mtt_hierarchy_depth_intra_slice_chroma (Eq. 2-26)

CuQpDeltaSubdiv=pic_cu_qp_delta_subdiv_intra_slice (Eq. 2-93)

CuChromaQpOffsetSubdiv=pic_cu_chroma_qp_offset_subdiv_intra_slice (Eq. 2-27)

(ii) Otherwise (slice_type equal to 0 (B) or 1 (P)),

MinQt Log 2SizeY=MinCb Log 2SizeY+pic_log 2_diff_min_qt_min_cb_inter_slice (Eq. 2-29)

MinQt Log 2SizeC=MinCb Log 2SizeC+pic_log 2_diff_min_qt_min_cb_inter_slice (Eq. 2-29)

MaxBtSizeY=1<<(MinQt Log 2SizeY+pic_log 2_diff_max_bt_min_qt_inter_slice) (Eq. 2-30)

MaxBtSizeC=1<<(MinQt Log 2SizeC+pic_log 2_diff_max_bt_min_qt_inter_slice) (Eq. 2-31)

MaxTtSizeY=1<<(MinQt Log 2SizeY+pic_log 2_diff_max_tt_min_qt_inter_slice) (Eq. 2-32)

MaxTtSizeC=1<<(MinQt Log 2SizeC+pic_log 2_diff_max_tt_min_qt_inter_slice) (Eq. 2-33)

MaxMtDepthY=pic_max_mtt_hierarchy_depth_inter_slice (Eq. 2-34)

MaxMtDepthC=pic_max_mt_hierarchy_depth_inter_slice (Eq. 2-35)

CuQpDeltaSubdiv=pic_cu_qp_delta_subdiv_inter_slice (Eq. 2-36)

CuChromaQpOffsetSubdiv=pic_cu_chroma_qp_offset_subdiv_inter_slice (Eq. 2-37)

II.5 Disabling Chroma Intra Prediction with Size of 2×N

In some embodiments, 2×N chroma intra blocks are removed in both dual tree and single tree. The p scheme is presented as follows:

II.5.1 Restriction of 2N in Dual Tree

In dual tree, 2×N intra chroma is restricted by disabling some splits as previously proposed. Particularly, the binary tree and ternary tree splits are prohibited for blocks with width of 4 and 8, respectively.

II.5.2 Restriction of 2N in Single Tree

In order to remove 2×N in single tree, two restrictions are proposed including an extension of local dual tree and restriction of CUP for chroma 2×N.

In the first restriction, if a partition with the width of 4 and the split is binary vertical split or the width of 8 and the split is ternary vertical split, it is treated as a SCIPU. Following the principle restriction of SCIPU, the chroma components are not split in intra-SCIPU (all luma blocks are encoded using non-inter mode and the non-split chroma block is coded using intra mode). For inter-SCIPU (all luma and chroma blocks are encoded using inter mode), the split of the chroma components is inherited from the luma component.

In the second restriction, for 4×N CIP blocks, the combination intra-inter prediction is only used for the luma component while only inter prediction is used for the chroma components.

It was asserted that the proposed restrictions ensure that the width of intra chroma blocks is always larger than or equal to 4, and thus 2×N pixels intra process is removed. This restriction makes the implementation of the video codec friendly for hardware implementations in terms of pipeline management and latency.

III. Rage of Minimum Luma Coding Block Size

In some embodiments, the minimum luma coding block size can be in a range of 4 to 128 luma samples, inclusive. For example, as described by B. Bross, J. Chen, S. Liu, Y.-K. Wang, "Versatile Video Coding (Draft 7)", ISO/AEC JTC1/SC29/WG11 JVET-P2001, October 2019, a SPS level syntax element, denoted by log 2_min_luma_coding_block_size_minus2, can be signaled to specify a minimum luma coding block size. log 2_min_luma_coding_block_size_minus2 plus 2 specifies a base 2 logarithm (log 2) value of the minimum luma coding block size. The value range of log 2_min_luma_coding_block_size_minus2 shall be in the range of 0 to log 2_ctu_size_minus5+3, inclusive.

The syntax element, log 2_ctu_size_minus5 (or in another form sps_log 2_ctu_size_minus5 when included in an SPS), can be another SPS level syntax element that specifies a luma coding tree block size of each CTU (i.e., a CTU size). sps_log 2_ctu_size_minus5 plus 5 specifies a log 2 value of the luma coding tree block size of each CTU. It is a requirement of bitstream conformance that the value of sps_log 2_ctu_size_minus5 be less than or equal to 2. In other words, the log 2 value of the luma coding tree block size of each CTU is in the range of 5 to 7. Accordingly, the luma coding tree block size of each CTU is in the range of 32 ($2^5$) to 128 ($2^7$) luma samples, inclusive.

Because the value range of log 2_min_luma_coding_block_size_minus2 shall be in the range of 0 to log 2_ctu_size_minus5+3, inclusive, the minimum luma coding block size can be in the range of 4 to the luma coding tree block size that is from 32 to 128 luma samples.

As an example, when the luma coding tree blocks size is signaled to be 128, it is possible an encoder may determine to use 128 as the minimum luma coding block size. When such a large block size is used, partitioning to smaller CUs to capture characteristics of local regions in a picture can be disallowed, which may lead to a fast decoding speed, however, with a cost of lower quality of a video sequence decoded at the decoder side.

The present disclosure provides solutions to solve the low quality issue caused by the overly large minimum luma coding block size.

III.1 Restricting Upper Limit of Minimum Luma Coding Block Size

In some embodiments, an upper limit of the range of the minimum luma coding block size is defined to be a specific value to restrict the minimum luma coding block size. For example, the allowable minimum luma coding block sizes can be limited to be in a range of 4 to 64 luma samples, inclusive, or 4 to 32 luma samples, inclusive.

Embodiment A

In an embodiment, as a bitstream conformance requirement specified in a video coding standard (e.g., VVC, HEVC, or the like), the minimum luma coding block size signaled in a bitstream is required to be in the range of 4 to (1≤(N+2)) luma samples (that is an equivalent to the range of $2^2$ to $2^{N+2}$). Accordingly, the log 2 value of the minimum luma coding block size is in the range of 2 to N+2, while the log 2 value of the minimum luma coding block size minus 2 is in the range of 0 to N. N can be an integer such as 0, 1, 2, 3, 4, or the like. By specifying the number N, an upper limit of the range of the minimum luma coding block size can be specified.

As an example, a syntax element, denoted by log 2_min_luma_coding_block_size_minus2 can be signaled in a parameter set (e.g., a SPS) to indicate a minimum luma coding block size. The semantics may be specified as follows:
  log 2_min_luma_coding_block_size_minus2 plus 2 specifies the minimum luma coding block size. The value range of log 2_min_luma_coding_block_size_minus2 shall be in the range of 0 to N, inclusive.
  Variables MinCb Log 2SizeY and MinCbSizeY can be derived as follows:

$$\text{MinCb Log 2SizeY} = \log 2\_\text{min\_luma\_coding\_block\_size\_minus2} + 2 \quad (\text{Eq. 3-1})$$

$$\text{MinCbSizeY} = 1 << \text{MinCb Log 2SizeY} \quad (\text{Eq. 3-2})$$

where MinCb Log 2SizeY represents a log 2 value of the minimum luma coding block size, while MinCbSizeY represents the minimum luma coding block size in luma samples.

N can be an integer, such as 0, 1, 2, 3, 4, or the like. When N equals 0, the minimum luma coding block size is fixed to a size of 4 luma samples. When N equals 4, the minimum luma coding block size is restricted to be in the range of 4 to 64 ($1<<(4+2)$) luma samples. When N equals 3, the minimum luma coding block size is restricted to be in the range of 4 to 32 ($1<<(3+2)$) luma samples.

In an embodiment, log 2_min_luma_coding_block_size_minus2 can be signaled with fixed length coding. When N equals to 1, 1-bit fixed length coding may be used. When N equals to 2 or 3, 2-bit fixed length coding may be used. In other embodiments, other coding schemes may be employed.

Embodiment B

In the above Embodiment A, the integer N is used to define an upper limit of the range of the minimum luma block size as $2^{N+2}$. When N takes a value of 0, 1, 2, 3, or 4, the maximum allowable minimum luma block size can be 4, 8, 16, 32, and 64, respectively. When a CTU size (e.g., 128) larger than $2^{N+2}$ is signaled in a parameter set (e.g., SPS), the upper limit $2^{N+2}$ is used for restricting the range of the minimum luma block size. When a CTU size smaller than $2^{N+2}$ is signaled in a parameter set (e.g., SPS)(such as when N=4, and $2^{N+2}=64$, the CTU size of 32 luma samples is signaled), this CTU size becomes the upper limit of the minimum luma block size. Therefore, an equivalent of Embodiment A is that the minimum luma block size is limited to be within a range of 0 to min($2^{N+2}$, CTU size). The smaller value of $2^{N+2}$ and CTU size is used as the upper limit of the minimum luma block size.

Accordingly, in another embodiment, as a bitstream conformance requirement specified in a video coding standard, the minimum luma coding block size signaled in a bitstream is required to be in the range of 4 to min(($1<<(N+2)$), CTU size) luma samples that is an equivalent to the range of 22 to min ($2^{N+2}$, $2^{lo2\ value\ of\ CTU\ size}$). Accordingly, the log 2 value of the minimum luma coding block size is in the range of 2 to min (N+2, log 2 value of CTU size). N can be an integer such as 0, 1, 2, 3, 4, or the like. By specifying the number N, an upper limit of the range of the minimum luma coding block size can be specified.

As an example, a syntax element, denoted by log 2_min_luma_coding_block_size_minus2 can be signaled in a parameter set (e.g., a SPS) to indicate a minimum luma coding block size. The semantics may be specified as follows:
  log 2_min_luma_coding_block_size_minus2 plus 2 specifies the minimum luma coding block size. The value range of log 2_min_luma_coding_block_size_minus2 shall be in the range of 0 to min(N, sps_log 2_ctu_size_minus5+3), inclusive.

The syntax element, sps_log 2_ctu_size_minus5, can be signaled in the same parameter set, and indicate a log 2 value of a CTU size minus 5.

N can be an integer, such as 0, 1, 2, 3, 4, or the like. In a first case, when N equals 0, the minimum luma coding block size is fixed to a size of 4 luma samples. In a second case, when N equals 4, the minimum luma coding block size is restricted to be in the range of 4 to min(64, CTU size) luma samples. When the CTU size is signaled to be 128 luma samples, the minimum luma coding block size is restricted to be in the range of 4 to 64 luma samples. When the CTU size is signaled to be 32 luma samples, the minimum luma coding block size is restricted to be in the range of 4 to 32 luma samples.

Embodiment C

In an embodiment, a decoder can be configured to verify whether a minimum luma coding block size signaled in a bitstream satisfies a bitstream conformance requirement during a decoding process. For example, the decoder can first receive a syntax element specifying the minimum luma coding block size from the bitstream. For example, the syntax element provides a log 2 value of the minimum luma coding block size minus 2. A log 2 value can also be referred to as a binary logarithm value or a base 2 logarithm value in the present disclosure.

The decoder can then verify whether the binary logarithm value of the minimum luma coding block size minus 2 is in a range of 0 to N, inclusive. N is an integer such as 0, 1, 2, 4 or the like, and N+2 represents a binary logarithm value of a predefined maximum allowable minimum luma coding block size. In an example, when the binary logarithm value of the minimum luma coding block size minus 2 is greater than N, the decoder can determine the bitstream conformance requirement is not satisfied, and may terminate the decoding process and/or output an error message. When it is determined that the binary logarithm value of the minimum luma coding block size minus 2 is within the range of 0 to N, the decoder may continue the decoding process.

Embodiment D

In an embodiment, a decoder can be configured to verify whether a minimum luma coding block size signaled in a bitstream satisfies a bitstream conformance requirement during a decoding process. For example, the decoder can receive a first syntax element specifying the minimum luma coding block size from the bitstream. The decoder can also receive a second syntax element, before or after the first syntax element, specifying a CTU size from the bitstream.

The decoder can then verify whether the minimum luma coding block size is within a range of allowable minimum luma coding block sizes. When the CTU size is greater than a predefined maximum allowable minimum luma coding block size, the predefined maximum allowable minimum luma coding block size is used as the upper limit of the range of allowable minimum luma coding block sizes. When the CTU size is smaller than the predefined maximum allowable minimum luma coding block size, the CTU size is used as the upper limit of the range of allowable minimum luma coding block sizes When the minimum luma coding block size is within the range of allowable minimum luma coding block sizes, the decoder can continue the decoding process. Otherwise, the decoder can terminate the decoding process.

Embodiment E

In an embodiment, a decoder can be configured to verify whether a minimum luma coding block size signaled in a bitstream satisfies a bitstream conformance requirement during a decoding process. For example, the decoder can receive a first syntax element specifying the minimum luma coding block size from the bitstream. For example, the syntax element provides a log 2 value of the minimum luma coding block size minus 2. The decoder can receive a second syntax element, before or after the first syntax element, specifying a CTU size from the bitstream. The second syntax element can provide a log 2 value of the CTU size minus 5, and be denoted by log 2_ctu_size_minus5.

The decoder can then verify whether the binary logarithm value of the minimum luma coding block size minus 2 is in a range of 0 to Min(N, log 2 ctu_size_minus5+3), inclusive. N is an integer such as 0, 1, 2, 3, 4, or the like. N+2 represents a binary logarithm value of a predefined maximum allowable minimum luma coding block size. log 2_ctu_size_minus5+5 represents a binary logarithm value of a CTU size.

When the minimum luma coding block size is within the range of allowable minimum luma coding block sizes, the decoder can continue the decoding process. Otherwise, the decoder can terminate the decoding process.

Embodiment F

In an embodiment, a decoder can be configured to verify whether a minimum luma coding block size signaled in a bitstream satisfies a bitstream conformance requirement during a decoding process. Similar to Embodiment E, the decoder can receive a first syntax element specifying the minimum luma coding block size from the bitstream. The syntax element provides a log 2 value of the minimum luma coding block size minus 2, and is denoted log 2_min_luma_coding_block_size_minus2. The decoder can receive a second syntax element, before or after the first syntax element, specifying a CTU size from the bitstream. The second syntax element can provide a log 2 value of the CTU size minus 5, and be denoted by log 2_ctu_size_minus5.

Different from Embodiment E, the decoder can first determine a binary logarithm value of the minimum luma coding block size to be log 2_min_luma_coding_block_size_minus2+2, and determine a binary logarithm value of a CTU size to be log 2_ctu_size_minus5+5. The decoder can then verify whether the binary logarithm value of the minimum luma coding block size is greater than Min(N+2, log 2_ctu_size). N is an integer such as 0, 1, 2, 3, 4, or the like. N+2 represents a binary logarithm value of a predefined maximum allowable minimum luma coding block size. log 2_ctu_size represents the binary logarithm value of the CTU size.

When the minimum luma coding block size is greater than Min(N+2, log 2_ctu_size), the decoder can terminate the decoding process and/or output an error message. Otherwise, the decoder can continue the decoding process.

III.2 Restriction of Minimum Luma Coding Block Sizes Based on CTU Size

In some embodiments, as a bitstream conformance requirement specified in a video coding standard, a difference between a maximum allowable minimum luma block size and a signaled CTU size is specified to restrict a range of minimum luma block size. The difference can be specified in terms of the log 2 values of the maximum allowable minimum luma block size and the signaled CTU size. For example, the minimum luma coding block size can be required to be in the range of 4 to (1<<(log 2_ctu_size_minus5+M+2)) luma samples. M can be an integer such as 0, 1, 2, 3, or the like. In terms of log 2 values, the upper limit of the range, log 2_ctu_size_minus5+M+2, can be (3-M) smaller than the CTU size, denoted by log 2_ctu_size_minus5+5. For example, when M equals 3, there is no difference between the upper limit and the CTU size. When M equals 2, the upper limit is a half of the CTU size in terms of luma samples. For example, for a CTU size of 128 luma samples, M equal to 2 defines an upper limit of 64 luma samples.

As an example, a syntax element, denoted by log 2≤min_luma_coding_block_size_minus2 can be signaled in a parameter set (e.g., a SPS) to indicate a minimum luma coding block size. The semantics may be specified as follows:

log 2_min_luma_coding_block_size_minus2 plus 2 specifies the minimum luma coding block size. The value range of log 2_min_luma_coding_block_size_minus2 shall be in the range of 0 to log 2_ctu_size_minus5+M, inclusive.

In an embodiment, a decoder can be configured to verify whether a minimum luma coding block size signaled in a bitstream satisfies the above bitstream conformance requirement during a decoding process. The decoder can receive a first syntax element specifying the minimum luma coding block size from the bitstream. The syntax element provides a log 2 value of the minimum luma coding block size minus 2. The decoder can receive a second syntax element, before or after the first syntax element, specifying a CTU size from the bitstream. The second syntax element can provide a log 2 value of the CTU size minus 5, and be denoted by log 2_ctu_size_minus5.

The decoder can then verifying whether the binary logarithm value of the minimum luma coding block size minus 2 is in a range of 0 to log 2_ctu_size_minus5+M, inclusive. Similarly, when the minimum luma coding block size is within the range of allowable minimum luma coding block sizes, the decoder can continue the decoding process. Otherwise, the decoder can terminate the decoding process.

III.3 Fixed Minimum Luma Coding Block Sizes

To avoid coding performance being decreased by an overly large minimum luma coding block size, in some embodiments, the minimum luma coding block size can be set to be a predefined value (e.g., 4 luma samples). In this way, tree-structure based block partitioning can be suitably performed to use various block sizes depending on statistics characteristics of local regions in a picture.

For example, the predefined value can be specified in a video coding standard as a bitstream conformance requirement. To verify whether a bitstream conforms to the minimum luma coding block size requirement, a decoder can receive a syntax element specifying the minimum luma coding block size in the bitstream, and check the value of the syntax element against the predefined value.

IV. Decoding Process with a Restricted Range of Minimum Luma Coding Block Size

Figure 21:
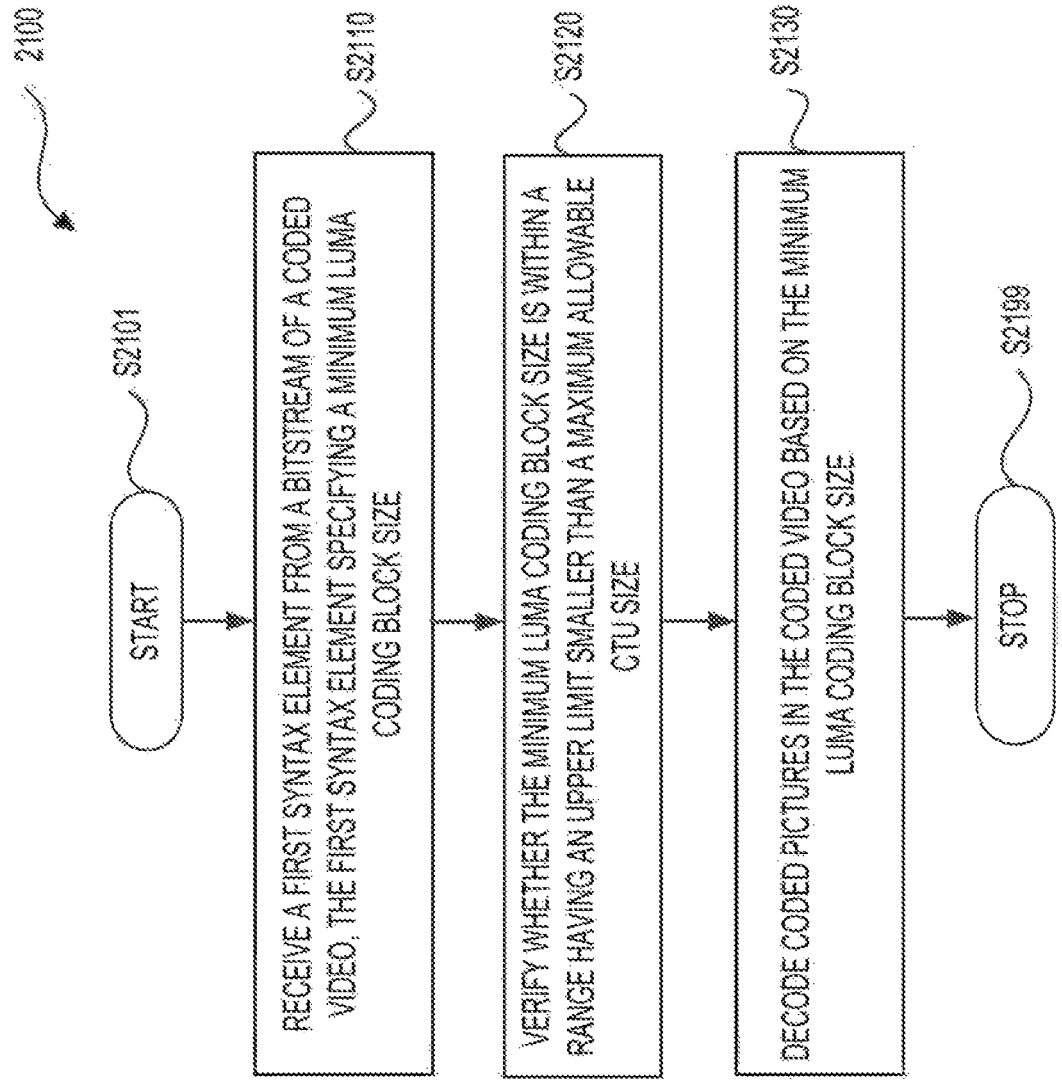
FIG. 21 shows a flowchart outlining a process (2100) according to an embodiment of the disclosure.

FIG. 21 shows a flowchart outlining a process (2100) according to an embodiment of the disclosure. The process (2100) can be used in decoding a sequence of picture coded in a bitstream. In various embodiments, the process (2100) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (2100) is implemented in software instructions, thus when the processing circuitry executes the software instructions, the processing circuitry performs the process (2100). The process starts at (S2101) and proceeds to (S2110).

At (S2110), a first syntax element can be received from a bitstream of a coded video. The first syntax element can specify a minimum luma coding block size and be included in a parameter set such as a SPS. Or, in some examples, the first syntax element specifying a minimum luma coding block size can be included in a picture header of one or more pictures in the bitstream, or other syntax structures. A picture header (PH) can be a syntax structure containing syntax elements that apply to all slices of a coded picture.

At (S2120), it is verified whether the minimum luma coding block size is within a range of allowable minimum luma coding block sizes. The range can be specified as a bitstream conformance requirement in a video coding standard (e.g., HEVC, VVC, or the like). The range can have a lower limit such as 4, 8, or 16 luma samples, and an upper limit smaller than a maximum allowable CTU size. For example, as specified in a video coding standard, the maximum allowable CTU size can be 128 luma samples. The upper limit of the range of the allowable minimum luma coding block sizes can be a value smaller than 128 luma samples.

For example, the upper limit can be the smaller one between a predefined maximum allowable minimum luma coding block size and a CTU size specified by a second syntax element. The predefined maximum allowable minimum luma coding block size can be represented by $1<<(N+2)$ (or in another form, $2^{N+2}$), where N can be 0, 1, 2, 3, 4, or the like. The second syntax element can be signaled in the bitstream.

In an example, N equals 4, and the predefined maximum allowable minimum luma coding block size is 64 luma samples. When the signaled CTU size is 128 luma samples, the verification operation can use the size, 64 luma samples, as the upper limit. When the signaled CTU size is 32 luma samples, the verification operation can use the size, 32 luma samples, as the upper limit. When the signaled CTU size is 64 luma samples, the same as the predefined maximum allowable minimum luma coding block size, the verification operation can use the size, 64 luma samples, as the upper limit.

In an example, when it is determined that the signaled minimum luma coding block size is within the range of allowable minimum luma coding block sizes, the process (2100) can continue. Otherwise, the process (2100) can be terminated. Additionally, the decoder can output an error message indicating the signaled minimum luma coding block size is not within the range of allowable minimum luma coding block sizes.

At (S2130), coded pictures in the coded video can be decoded based on the minimum luma coding block size. The coded pictures refer the parameter set that includes the first syntax element. Or, the coded pictures each include the picture header that includes the first syntax element. Thus, CUs in the coded pictures can have luma coding block sizes larger than or equal to the minimum luma coding block size indicated by the first syntax element.

Various decoding operations can be performed based on the minimum luma coding block size. In an example, the picture size of the coded video can comply with the following rule. pps_pic_width_in_luma_samples specifies the width of each decoded picture referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples. The MinCbSizeY represents the minimum luma coding block size. Accordingly, the decoder can verify if the width of each decoded picture referring to the PPS comply with the rule based on the minimum luma coding block size.

As another example, the minimum luma coding block size, MinCbSizeY, can be used to determine a maximum number of bins resulting from decoding the contexts of decoded slice NAL units as specified in Versatile Video Coding (Draft 7). Specifically, let NumBytesInVclNalUnits be the sum of the values of NumBytesInNalUnit for all VCL NAL units of a coded picture. Let BinCountsInNalUnits be the number of times that the parsing process function DecodeBin( ) is invoked to decode the contents of all VCL NAL units of a coded picture. Let the variable RawMinCuBits be derived as follows:

RawMinCuBits=MinCbSize*Y**MinCbSize*Y**(Bit-Depth+2*BitDepth/(SubWidth*C**SubHeight*C*))  (Eq. 3-3)

The value of BinCountsInNalUnits shall be less than or equal to (32÷3)*NumBytesInVclNalUnits+ (RawMinCuBits*PicSizeInMinCbsY)÷32.

The process (2100) can proceed to (S2199) after (S2130), and terminates at (S2199).

V. Computer System

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
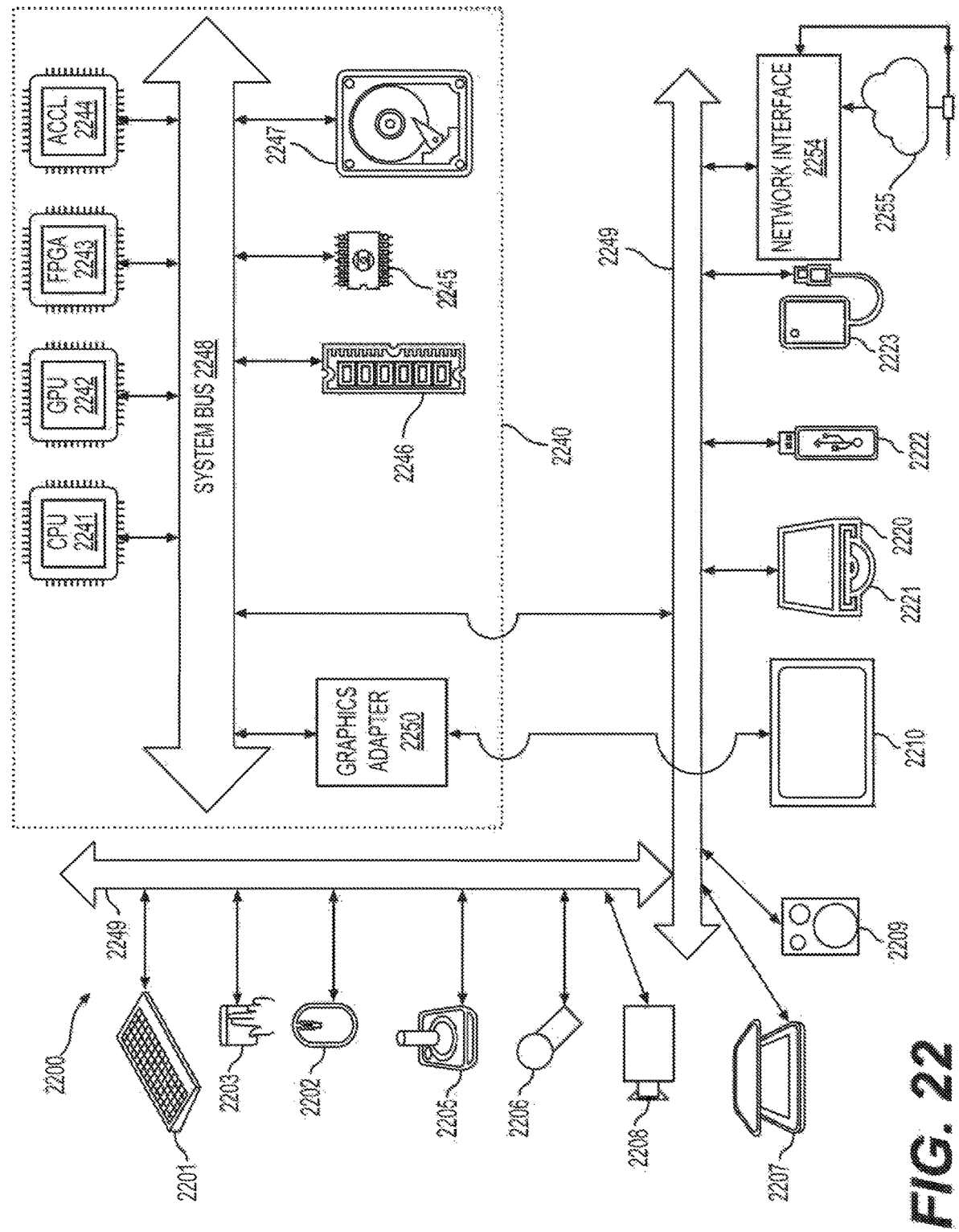
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243) hardware accelerators for certain tasks (2244), graphics adapters (~~50) and so forth. These devices, along with Read-only memory (ROM)(2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

Appendix A: Acronyms

AMVP: Advanced MVP
ASIC: Application-Specific Integrated Circuit
BDOF: Bi-directional optical flow
BMS: benchmark set
CANBus: Controller Area Network Bus
CBF: Coded Block Flag
CCLM: Cross-Component Linear Mode/Model
CD: Compact Disc
CIP: Combined Inter/Intra prediction
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HMVP: History-based MVP
HRD: Hypothetical Reference Decoder
IC: Integrated Circuit
JEM: joint exploration model
LAN: Local Area Network
LCD: Liquid-Crystal Display
LFNST: Low Frequency Non Separable Transform
LIC: Luma Illumination Compensation
LTE: Long-Term Evolution
MMVD: Merge with MVD
MV: Motion Vector
MVD: Motion vector difference
MVP: Motion vector predictor
OLED: Organic Light-Emitting Diode
PBs: Prediction Blocks
PCI: Peripheral Component Interconnect
PDPC: Position Dependent Prediction Combination
PLD: Programmable Logic Device
PUs: Prediction Units
RAM: Random Access Memory
ROM: Read-Only Memory
RST: Reduced Secondary Transform
SbTMVP: Subblock-based TMVP
SCIPU: Smallest chroma intra prediction unit
SEI: Supplementary Enhancement Information
SNR: Signal Noise Ratio
SSD: solid-state drive
TMVP: Temporal MVP
TPM: Triangular partitioning mode
TUs: Transform Units,
USB: Universal Serial Bus
VPDU: Visual Process Data Unit
VTM: Versatile test model
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
   receiving a first syntax element from a bitstream of a coded video, the first syntax element specifying a minimum luma coding block size;
   verifying whether the minimum luma coding block size is within a range of allowable minimum luma coding block sizes having an upper limit smaller than a maximum allowable coding tree unit (CTU) size; and
   in response to the minimum luma coding block size being within the range of allowable minimum luma coding block sizes, decoding a coded picture in the coded video based on the minimum luma coding block size,
   wherein the first syntax element indicates a binary logarithm value of the minimum luma coding block size minus 2, and
   the verifying includes verifying whether the binary logarithm value of the minimum luma coding block size minus 2 is in a range of 0 to Min(N, log 2_ctu_size_minus5+3), inclusive, where N is 4, and log 2_ctu_size_minus5+5 represents a binary logarithm value of a CTU size of the coded video.

2. The method of claim 1, further comprising:
   receiving a second syntax element from the bitstream of the coded video, the second syntax element specifying CTU size.

3. An apparatus of video decoding, comprising circuitry configured to:
   receive a first syntax element from a bitstream of a coded video, the first syntax element specifying a minimum luma coding block size;
   verify whether the minimum luma coding block size is within a range of allowable minimum luma coding block sizes having an upper limit smaller than a maximum allowable coding tree unit (CTU) size; and
   in response to the minimum luma coding block size being within the range of allowable minimum luma coding block sizes, decode a coded picture in the coded video based on the minimum luma coding block size,
   wherein the first syntax element indicates a binary logarithm value of the minimum luma coding block size minus 2, and
   the circuitry is further configured to:
      verify whether the binary logarithm value of the minimum luma coding block size minus 2 is in a range of 0 to Min(N, log 2_ctu_size_minus5+3), inclusive, where N is 4, and log 2_ctu_size_minus5+5 represents a binary logarithm value of a CTU size of the coded video.

4. The apparatus of claim 3, wherein the circuitry is further configured to:
   receive a second syntax element from the bitstream of the coded video, the second syntax element specifying the CTU size.

5. A non-transitory computer-readable medium storing instructions that, when executed by a processor, cause the processor to perform a method of video decoding, the method comprising:
   receiving a first syntax element from a bitstream of a coded video, the first syntax element specifying a minimum luma coding block size;
   verifying whether the minimum luma coding block size is within a range of allowable minimum luma coding block sizes having an upper limit smaller than a maximum allowable coding tree unit (CTU) size; and in response to the minimum luma coding block size being within the range of allowable minimum luma coding block sizes, decoding a coded picture in the coded video based on the minimum luma coding block size, wherein the first syntax element indicates a binary logarithm value of the minimum luma coding block size minus 2, and the verifying includes verifying whether the binary logarithm value of the minimum luma coding block size minus 2 is in a range of 0 to Min(N, log 2_ctu_size_minus5+3), inclusive, where N is 4, and log 2_ctu_size_minus5+5 represents a binary logarithm value of a CTU size of the coded video.

* * * * *